(12) United States Patent
Meehan et al.

(10) Patent No.: US 7,527,174 B2
(45) Date of Patent: May 5, 2009

(54) STATIONARY SOAP DISPENSER ASSEMBLY

(75) Inventors: Steven Kyle Meehan, Fishers, IN (US); Darrell Scott Crowe, Lebanon, IN (US); Alfred C. Nelson, Carmel, IN (US)

(73) Assignee: Masco Corporation of Indiana, Indianapolis, IN (US)

(*) Notice: Subject to any disclaimer, the term of this patent is extended or adjusted under 35 U.S.C. 154(b) by 620 days.

(21) Appl. No.: 10/896,827

(22) Filed: Jul. 22, 2004

(65) Prior Publication Data

US 2005/0155988 A1 Jul. 21, 2005

Related U.S. Application Data

(60) Provisional application No. 60/537,450, filed on Jan. 16, 2004.

(51) Int. Cl.
*B67D 5/06* (2006.01)
*B65D 88/54* (2006.01)
*B67D 5/40* (2006.01)

(52) U.S. Cl. .................. 222/180; 222/383.1; 4/696; 239/333; 141/332

(58) Field of Classification Search .................. 222/180, 222/186, 321.1, 324, 383.1, 173, 190, 420, 222/195, 185.1, 321.9, 321.7, 385; 4/286, 4/294, 696; 239/333; 264/12, 43; 141/2, 141/320, 332
See application file for complete search history.

(56) References Cited

U.S. PATENT DOCUMENTS

| 1,383,272 | A | 6/1921 | Woore |
|---|---|---|---|
| 1,789,338 | A | 1/1931 | Kooperstein |
| 1,951,910 | A | 3/1934 | Heffner et al. |
| 2,022,208 | A | 11/1935 | Lacke |
| 2,183,370 | A | 12/1939 | Selitzky |
| 2,204,838 | A | 6/1940 | Walstrom |
| 2,205,875 | A | 6/1940 | Coffey et al. |
| 2,562,111 | A | 7/1951 | Michel |
| 2,603,389 | A | 7/1952 | Maxwell |
| 2,639,063 | A | 5/1953 | Yuza |
| 2,657,833 | A | 11/1953 | Steczynski et al. |
| 2,772,116 | A * | 11/1956 | Dobkin ........................ 222/190 |
| 2,837,246 | A | 6/1958 | Steele |
| 2,869,762 | A | 1/1959 | Sanders |
| 3,144,177 | A | 8/1964 | Cookson |
| 3,664,556 | A | 5/1972 | Perry et al. |

(Continued)

OTHER PUBLICATIONS

Moen® Liquid Dispenser Model 3910 Series Manual, Sep. 1995, 6 pages.

(Continued)

*Primary Examiner*—Kevin P Shaver
*Assistant Examiner*—Melvin A Cartagena
(74) *Attorney, Agent, or Firm*—Leon E. Redman

(57) ABSTRACT

A fluid dispenser system includes a container that is mounted below a mounting surface for containing a fluid. A base is mounted above the mounting surface, and the base defines an opening configured to allow passage of the fluid when filling the container. A dispenser body is detachably coupled to the base to allow removal of the dispenser for filling the container with the fluid from above the mounting surface. The dispenser body has a moveable handle that is moveable for manually pumping the fluid and a fixed spout that is fixed in position relative to the mounting surface when the fluid is dispensed from the spout.

14 Claims, 24 Drawing Sheets

U.S. PATENT DOCUMENTS

| | | | |
|---|---|---|---|
| 3,730,398 A | 5/1973 | Goda | |
| 4,429,813 A | 2/1984 | De Freitas | |
| 4,561,571 A | 12/1985 | Chen | |
| 4,869,404 A | 9/1989 | Elliott | |
| 4,938,384 A | 7/1990 | Pilolla et al. | |
| 5,148,948 A | 9/1992 | Granville et al. | |
| 5,226,566 A * | 7/1993 | Brandenburg | 222/180 |
| 5,240,147 A | 8/1993 | Frazier et al. | |
| 5,287,996 A * | 2/1994 | Uhlig | 222/189.09 |
| 5,332,129 A * | 7/1994 | Brattoli et al. | 222/321.7 |
| 5,427,284 A | 6/1995 | Inch | |
| 5,480,068 A | 1/1996 | Frazier et al. | |
| 5,497,915 A | 3/1996 | Wass | |
| 5,632,414 A | 5/1997 | Merriweather, Jr. | |
| 5,823,397 A | 10/1998 | Gil | |
| 5,906,319 A | 5/1999 | Crowl | |
| 6,006,784 A | 12/1999 | Tsutsui et al. | |
| 6,142,193 A * | 11/2000 | Sanders | 141/300 |
| 6,142,342 A | 11/2000 | Lewis | |
| 6,370,712 B1 | 4/2002 | Burns et al. | |
| D466,191 S | 11/2002 | Lord | |
| D466,588 S | 12/2002 | Lord | |
| D466,976 S | 12/2002 | Lord | |
| D466,978 S | 12/2002 | Lord | |
| D467,305 S | 12/2002 | Lord | |
| 6,651,851 B2 | 11/2003 | Muderlak et al. | |
| D483,589 S | 12/2003 | Lord | |
| 6,718,568 B1 | 4/2004 | Hensley | |
| D490,262 S | 5/2004 | Graves et al. | |
| 2002/0158084 A1 * | 10/2002 | Herring et al. | 222/321.7 |
| 2003/0197072 A1 * | 10/2003 | Flieger | 239/428.5 |

OTHER PUBLICATIONS

"Design on Demand", Better Homes & Gardens, Feb. 2004, p. 64.

Delta Michael Graves Collection, Single Lever Widespread Kitchen Faucets, Models 186 & 187 Installation Manual, © 2003 Masco Corporation of Indiana, p. 1-8.

* cited by examiner

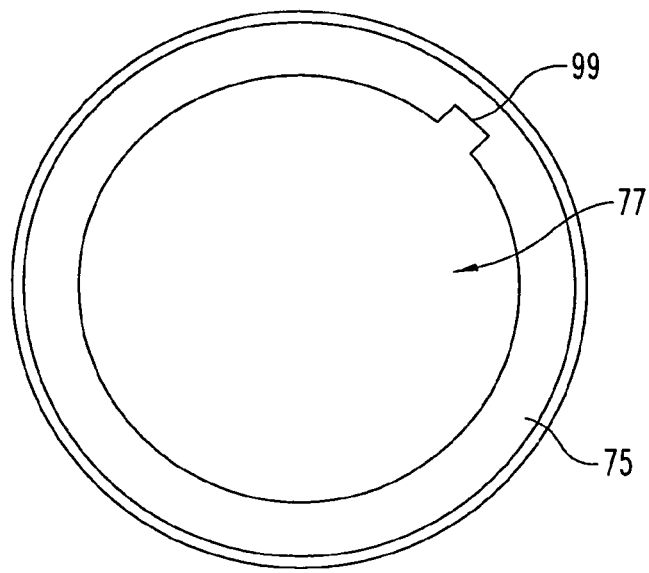
Fig. 9
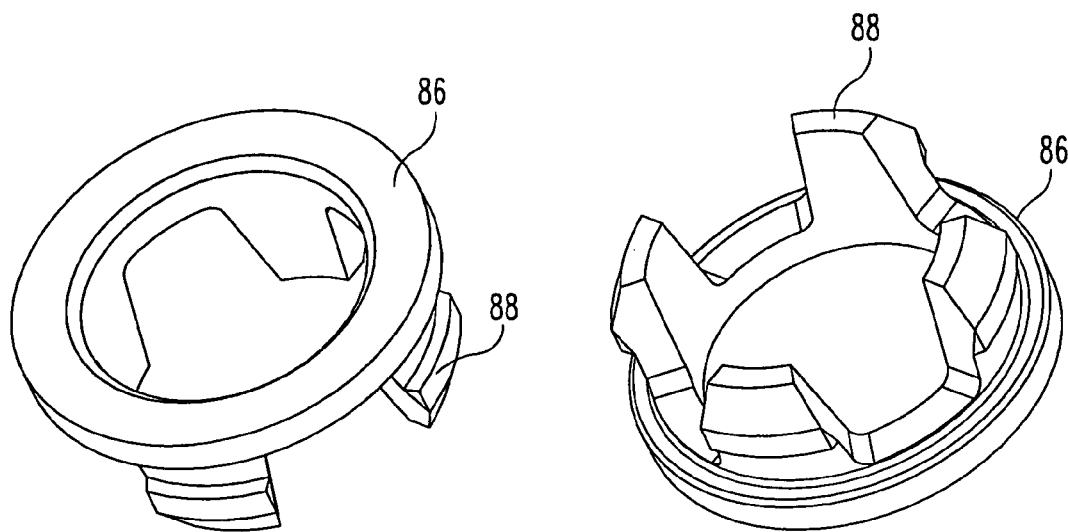
Fig. 10  Fig. 11

STATIONARY SOAP DISPENSER ASSEMBLY

REFERENCE TO RELATED APPLICATIONS

The present application claims the benefit of U.S. Provisional Patent Application No. 60/537,450, filed Jan. 16, 2004, which is hereby incorporated by reference in its entirety.

BACKGROUND

The present invention generally relates to fluid dispensers, such as liquid soap dispensers, and more specifically, but not exclusively, concerns a manually operated liquid soap dispenser with an outlet that remains generally stationary during dispensing of liquid soap and allows the soap to be refilled from the top of a countertop.

Typical soap dispensers utilize a decorative head assembly that is attached to the pump. In order to dispense fluid, such as liquid soap, the entire head assembly moves downwardly and upwardly in a telescoping fashion as the pump is actuated. By using a moveable head, the appearance of the soap dispenser can be aesthetically unappealing. Many factors make this type of dispenser design unappealing, such as large gaps as well as visual steps formed between the dispensing head and base of the dispenser. Since the soap is dispensed from the head, the moveable head creates a moving target from which the soap is dispensed, and this moving target in turn can create unsanitary conditions. For example, as the head moves in a downward direction, the outlet of the dispenser can come into contact with dirt from the hands being cleaned, and during an upstroke of the head, the dirt can be sucked up into the dispenser, so that the inside of the dispenser becomes contaminated.

In modern kitchens and bathrooms, sinks are now incorporating integral soap dispensers that are fixed to the sink or the countertop. Typically, the container that stores the liquid soap for the dispenser is mounted underneath the sink or countertop. Most soap dispensers are designed for public facilities, such as public restrooms, where theft of the soap dispenser is always a concern. To alleviate concerns about theft of the soap dispenser, the soap dispenser is permanently mounted to the countertop, thereby making removal of the soap dispenser from the countertop rather difficult. To refill the container with soap, the container must be removed from underneath the sink, filled with the soap and mounted again underneath the sink. As should be appreciated refilling such dispensers can be cumbersome, and as a result, many soap containers are not refilled or are only refilled on a sporadic basis. Another concern with fixed soap dispensers is that due to their fixed nature, the soap dispenser can be difficult to clean.

Usually, sinks for modern kitchens and bathrooms are manufactured with additional openings, such as for soap dispensers, spray heads, purified water dispensers, boiling water dispensers, water controls and the like. Depending on the style of the fixtures chosen for a sink, some of these openings remain unused. Typically, these openings are covered with a cap that some consider aesthetically unappealing or even ugly, because they fail to provide a clean look to the sink. To add decorative appeal to a sink, some consumers place decorative objects around the sink area. However, since the decorative objects are not secured, they can easily fall into the sink or onto floor, thereby creating safety concerns. Aesthetics is also a concern with the design of soap dispensers, especially in homes. Designs of home kitchens and baths vary from house to house and change over time based changes in the tastes of consumers. Typical soap dispenser are utilitarian in nature and do not allow flexibility in providing a wide range of appearances, that is the outside appearance of the dispenser is highly dependent on the structure of the pump mechanism contained in the dispenser. Over time styles of soap dispensers can become dated, but their designs are not changed, due to the prohibitive costs involved in redesigning the dispenser and retrofitting equipment.

Thus, there is a need for improvement in this field.

SUMMARY

One aspect, among many, of the present invention concerns a fluid dispenser system. The fluid dispenser system includes a container that is mounted below a mounting surface for containing a fluid. A base is mounted above the mounting surface, and the base defines an opening configured to allow passage of the fluid when filling the container. A dispenser body is detachably coupled to the base to allow removal of the dispenser for filling the container with the fluid from above the mounting surface. The dispenser body has a moveable handle that is moveable for manually pumping the fluid and a fixed spout that is fixed in position relative to the mounting surface when the fluid is dispensed from the spout.

Another aspect concerns a fluid dispenser that includes a housing with a fixed spout for dispensing fluid, and the housing defines an internal cavity. A retainer is coupled to the housing inside the internal cavity, and the retainer includes at least one retention clip for securing the retainer to a base. A handle extends from the housing, and the handle is moveable relative to the housing for manually dispensing the fluid. An insert is slidably coupled to the retainer, and the insert including a tube coupling portion. A dispensing tube is coupled between the tube coupling portion of the insert and the spout of the housing. The tube is flexible to permit movement of the dispensing tube inside the internal cavity as the handle is moved. A pump mechanism is coupled to the dispensing tube at the coupling portion of the insert for supplying the fluid to the spout via the dispensing tube. The insert transmits the movement of the handle to actuate the pump mechanism.

A further aspect concerns a kit that includes a base, which defines an opening through which fluid is supplied from a container. A fluid dispenser is configured to detachably couple to the base for dispensing the fluid from the container. The kit further includes an object that is configured to detachably couple to the base for covering the opening in the base when the fluid dispenser is removed from the base.

Further forms, objects, features, aspects, benefits, advantages, and embodiments of the present invention will become apparent from a detailed description and drawings provided herewith.

BRIEF DESCRIPTION OF DRAWINGS

FIG. 9 is a cross-sectional view of the FIG. 8 housing as taken along line 9-9 in FIG. 8.

FIG. 10 is a top perspective view of guide used in the FIG. 1 dispenser.

FIG. 11 is a bottom perspective view of the FIG. 10 guide.

DESCRIPTION OF SELECTED EMBODIMENTS

Figure 1:
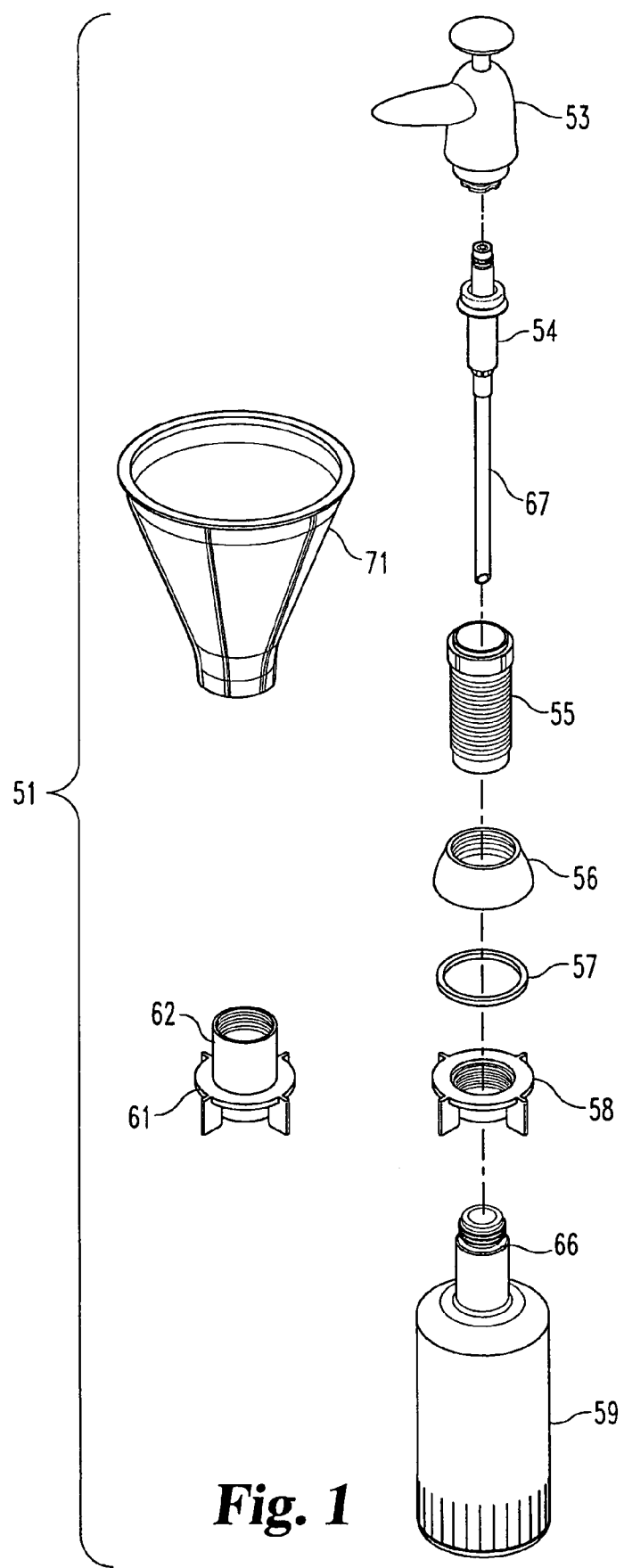
FIG. 1 is an exploded view of a fluid dispenser according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

A fluid dispenser assembly or kit 51, according to one embodiment (among others) of the present invention, will initially be described with reference to FIGS. 1 through 7. The fluid dispenser 51 is designed to generally remain fixed in position relative to a deck surface on which the dispenser 51 is mounted, such as a sink or countertop, while fluid is manually dispensed. Although the fluid dispenser 51 will be described with reference to a soap dispenser, it should be appreciated that the dispenser 51 can dispense other types of fluids, such as skin lotions, oils, shampoos and detergents, for example. Moreover, it is envisioned that the dispenser 51 can be mounted to other surfaces besides countertops and sinks.

Figure 2:
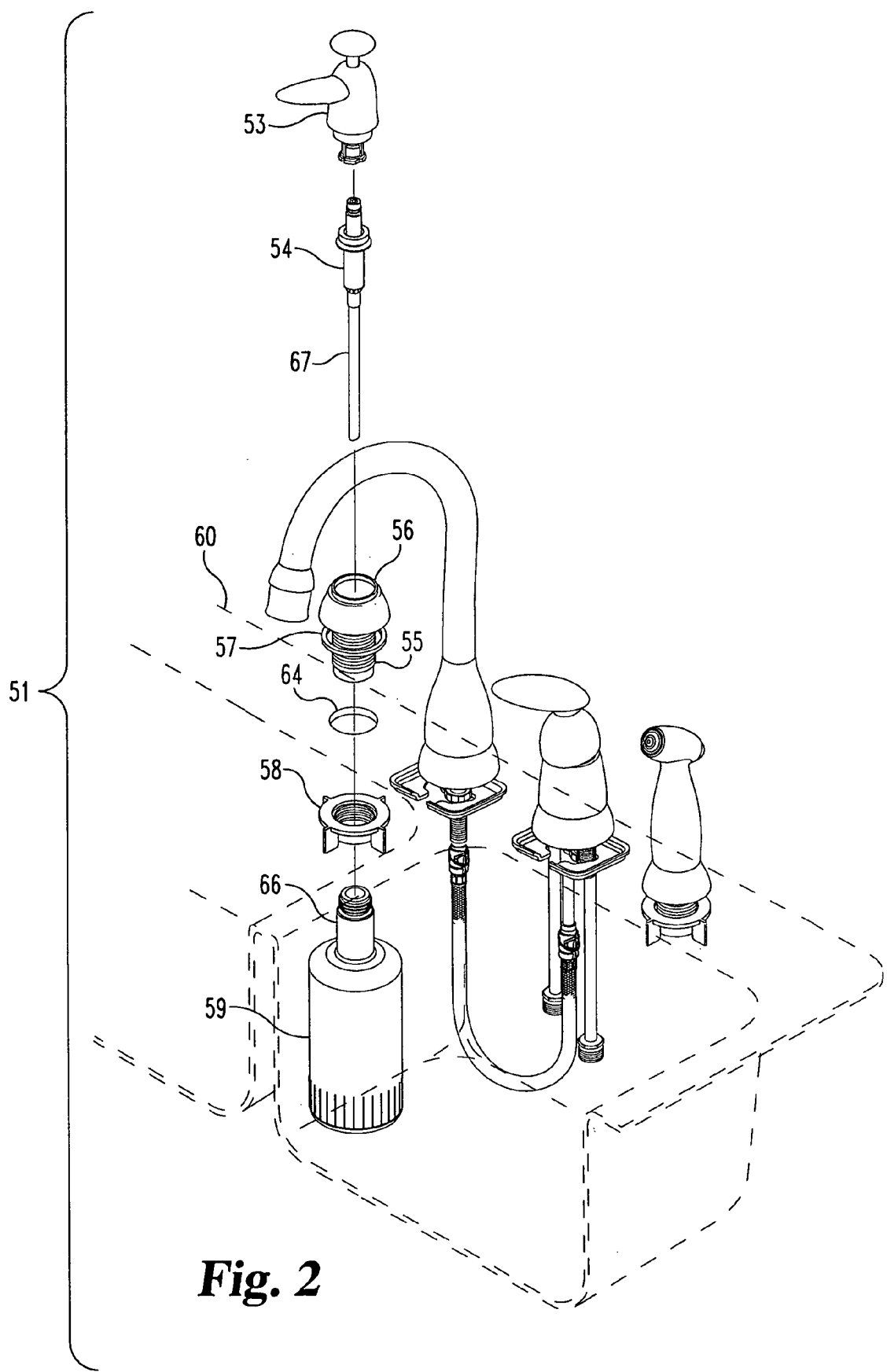
FIG. 2 is an exploded view of the FIG. 1 dispenser during installation in a sink.

Referring to FIG. 1, the fluid dispenser 51 includes a dispenser body 53 from which the fluid is dispensed, a pump mechanism 54 for drawing the fluid, a connector 55, a base 56, a gasket 57, a nut 58 and a fluid container 59 in which the fluid is stored. In one form, the dispenser body 53 and base 56 are made of metal; while the connector 55, nut 58 and container 59 are made of plastic. However, it should be appreciated that these components can be made from other types of materials. As depicted in FIG. 2, the nut 58 is used to secure the base 56 to a mounting surface or deck 60, such as a sink or countertop, via the connector 55. A larger nut 61 with a threaded extension 62, as is shown in FIG. 1, can be used to secure the base 56 to thicker mounting surfaces. In FIG. 2, the connector 55 is coupled to the base 56 and extends through an opening 64 in the sink 60. As shown, the container 59 is secured below the sink 60. To secure the container 59, the nut 58 is threadedly secured to the outside of the connector 55, and the container 59 has a threaded neck 66 that is threadedly secured to the inside of the connector 55. The gasket 57 is disposed between the base 56 and the mounting surface 60 in order to minimize water leakage through the opening 64 in the sink 60. The pump 54 is secured to the dispenser body 53, and the pump 54 has a feed tube 67 that is configured to extend inside the container 59 to draw fluid. The pump 54 is of the type of dispensing pumps as generally known to those skilled in the art. For instance, the pump 54 in one embodiment is a pump mechanism is a type supplied by Kaufman Container of Cleveland, Ohio.

Figure 3:
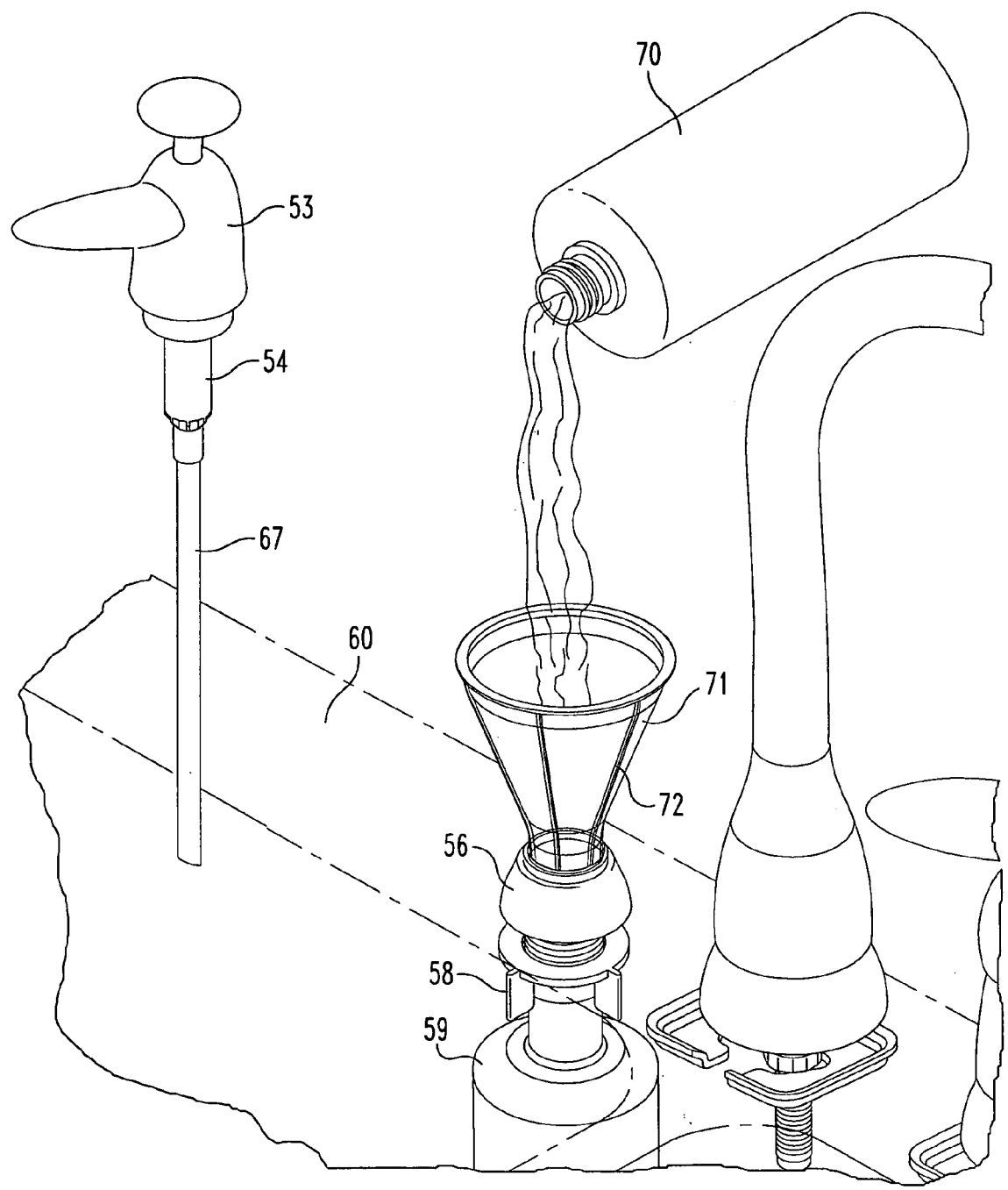
FIG. 3 is a perspective view of the FIG. 1 dispenser when refilled with fluid.

During use, the dispenser body 53 is detachably coupled to base 56 so that the dispenser body 53 is able to dispense fluid from container 59. To refill the container 59 with fluid, the dispenser body 53 and the pump 54 are initially detached as a unit from the base 56 from the topside of the sink 60 so as to permit access to the container 59, as is depicted in FIG. 3. Fluid can then be poured from a refill bottle 70 or some other supply means into the container 59 through the base 56 from the topside of the sink 60. In the illustrated embodiment, the fluid dispenser kit 51 can include a funnel 71 to assist in pouring the fluid into the container 59. The illustrated funnel 71 is a vented funnel that has one or more ribs 72 that space the funnel 71 from the base 56 in order to permit the flow of air from the container 59 as the fluid fills the container 59. As should be appreciated, the container 59 can be refilled without the use of the funnel 71 and/or can be filled by some other means. After the container 59 is filled, the dispenser body 53 is reattached to the base 56.

Figure 4:
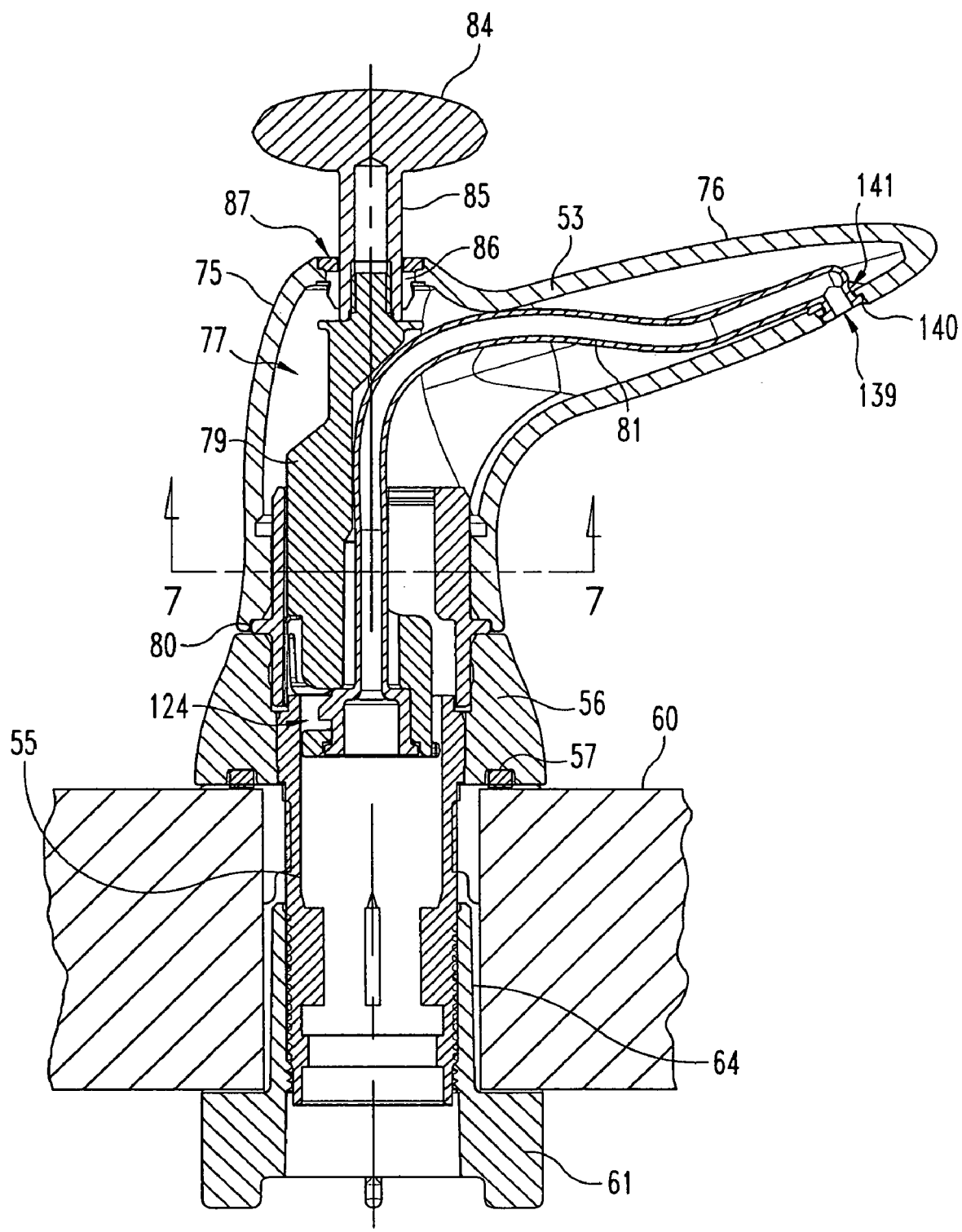
FIG. 4 is a first, side cross-sectional view of the FIG. 1 dispenser with a knob of the FIG. 1 dispenser in an extended position.
Figure 5:
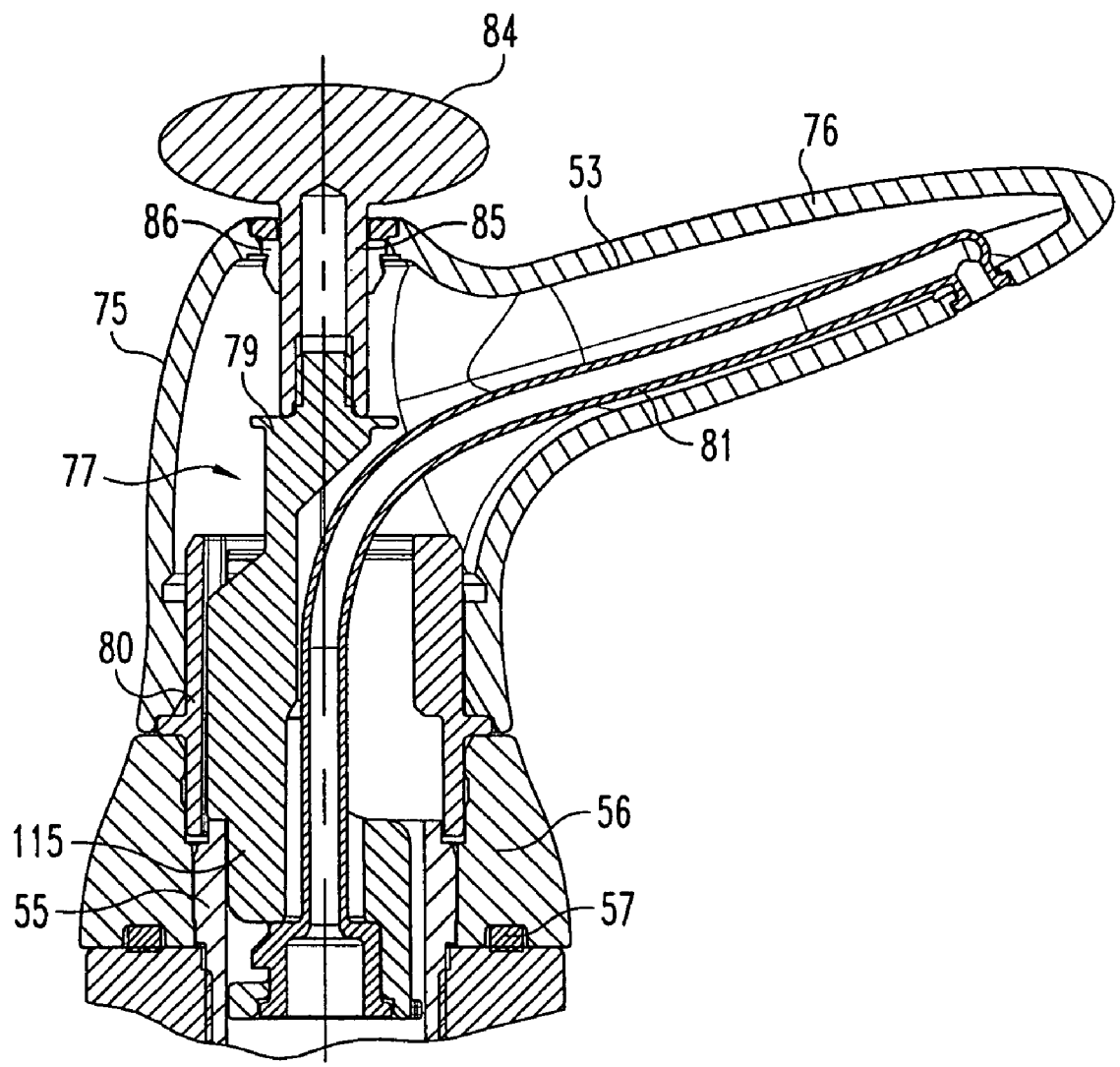
FIG. 5 is a second, side cross-sectional view of the FIG. 1 dispenser with the knob of in a retracted position.
Figure 6:
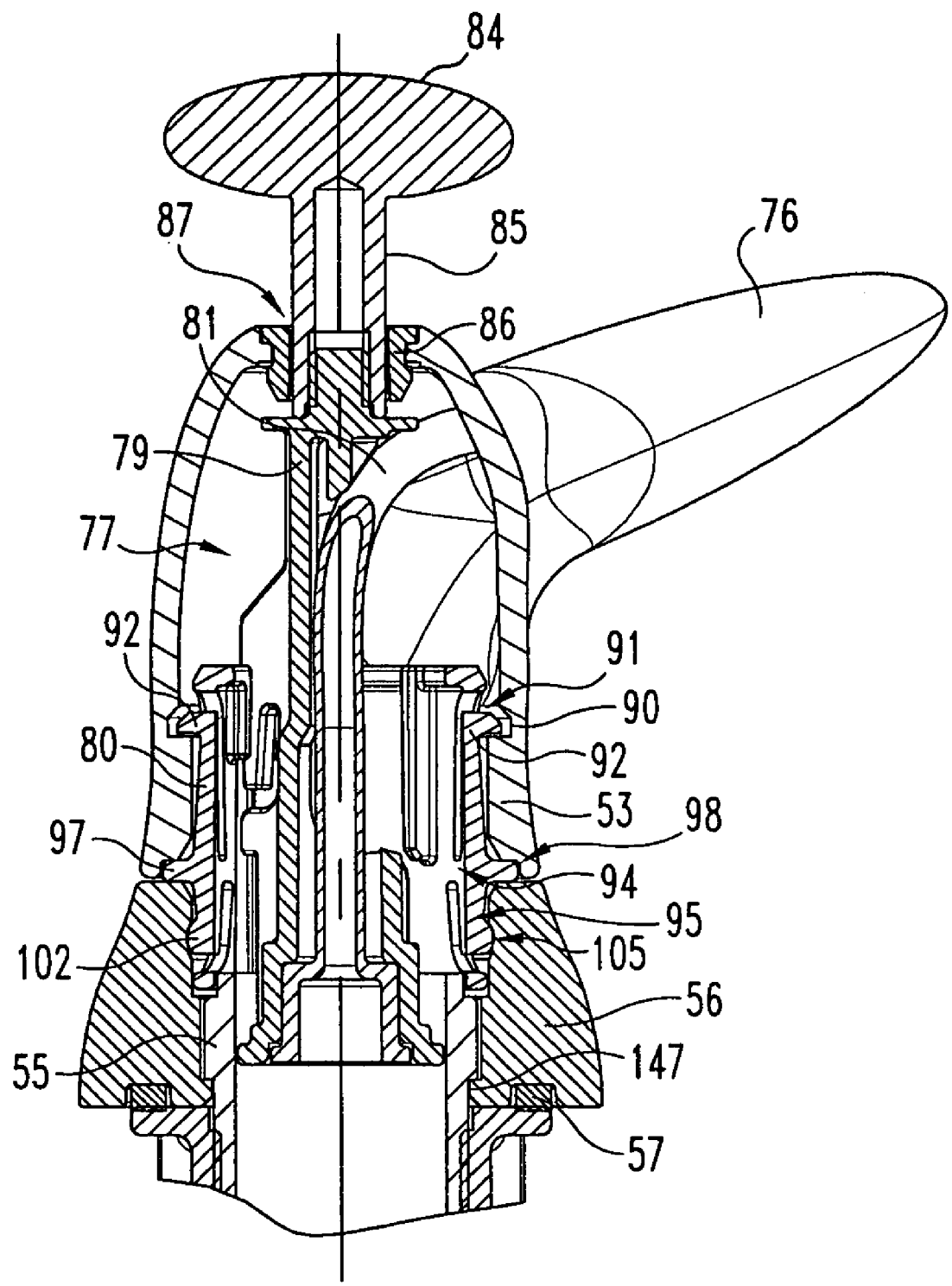
FIG. 6 is a third, side cross-sectional view of the FIG. 1 dispenser.
Figure 7:
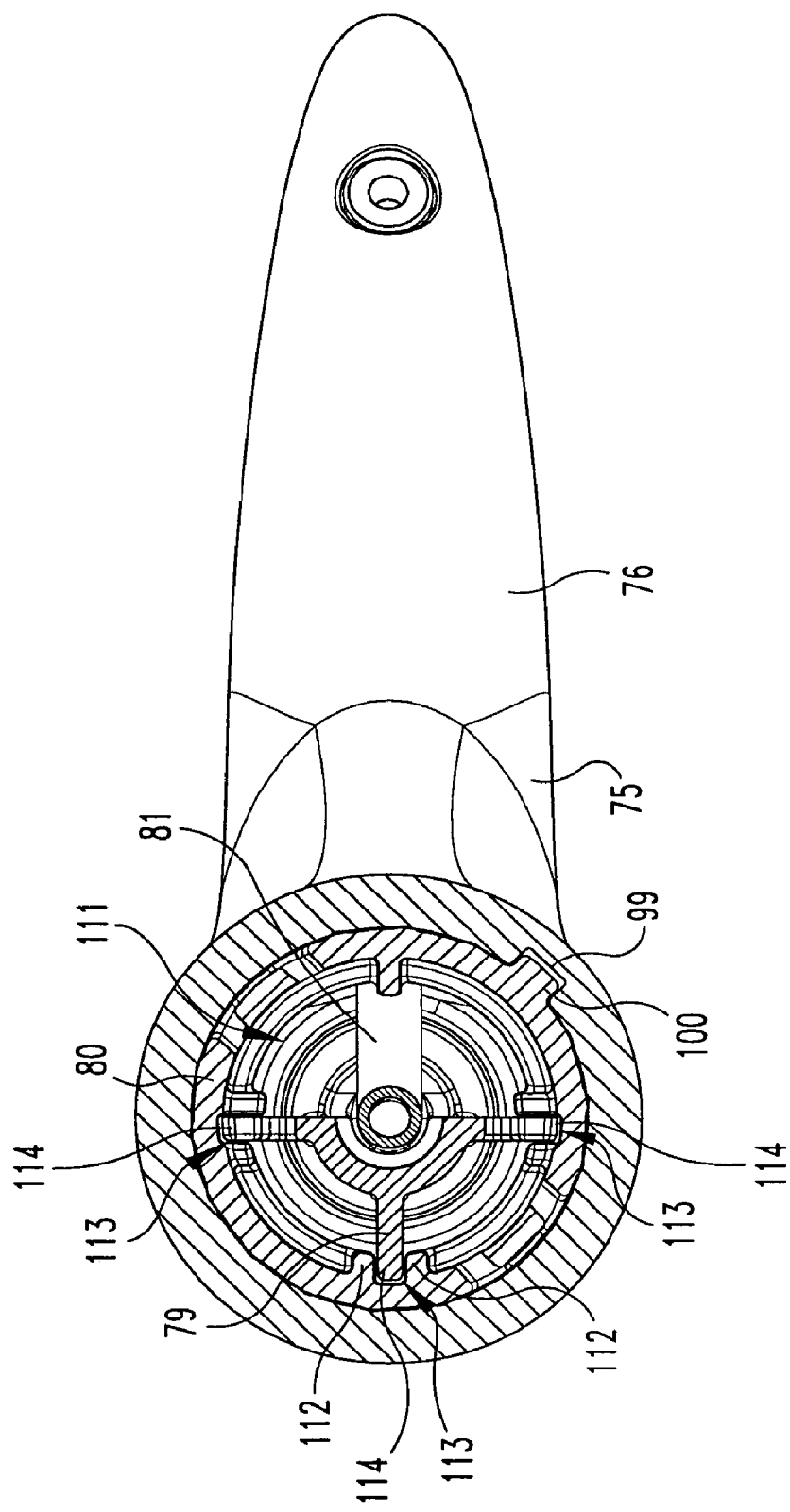
FIG. 7 is a bottom cross sectional view of the FIG. 1 dispenser.
Figure 8:
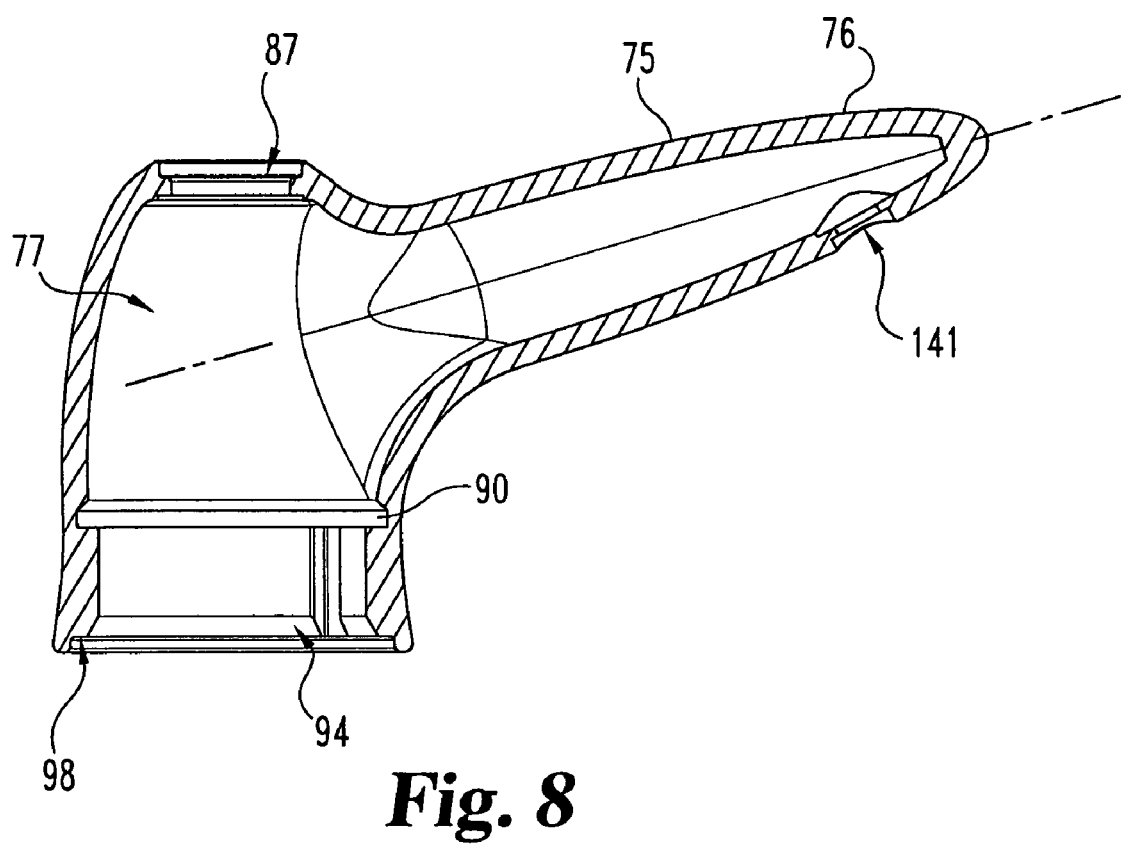
FIG. 8 is a side cross-sectional view of a housing for the FIG. 1 dispenser.

With reference to FIGS. 4 through 7, the dispenser body 53 has a housing 75 with a spout 76 for dispensing the fluid. As illustrated in FIG. 4, the housing 75 defines an internal cavity 77 (see also, FIGS. 8 and 9). An insert 79, a retainer 80 and a flexible liner or dispensing tube 81 are disposed inside the internal cavity 77. In one form, the insert 79 and the retainer 80 are made of plastic, but it is envisioned that they can be made from other types of materials. The insert 79 is coupled to a knob or handle 84, which extends from the housing 75, for pumping the fluid. According to the illustrated embodiment, the knob 84 is connected to the insert 79 through a threaded connection, but it should be understood that the knob 84 can be connected to the insert 79 in other manners, such as with an adhesive. A stem 85 of the knob 84 is slidably disposed within a guide 86 that is clipped to a guide opening 87 in the housing 75. Referring to FIGS. 10 and 11, the guide 86 includes one or more clip members 88 that clip the guide 86 to the housing 75. In the illustrated embodiment, the guide 86 and the stem 85 of the knob 84 are generally cylindrical in shape, but it should be appreciated that the guide 86 and the stem 85 can be shaped differently in other embodiments. As can be seen in FIGS. 6 and 8, the housing 75 defines a retention groove 90 to which a housing end portion 91 of the retainer 80 is secured. In the illustrated embodiment, the retainer 80 has one or more clip arms 92 that clip into the retention groove 90 of the housing 75. Opposite the guide opening 87, the housing 75 defines a connection opening 94 from which a base end portion 95 of the retainer 80 extends. Between the housing end portion 91 and the base end portion 95, the retainer 80 has a retention flange 97 (FIG. 12) that, along with the clip arms 92, secures the retainer 80 to the housing 75. Around the connection opening 94, the housing 75 in FIG. 8 has a flange groove 98 in which the retention flange 97 of the retainer 80 is received. With reference to FIGS. 7 and 9, the housing 75 further defines an orientation notch 99 in which an orientation tab 100 of the retainer 80 is received so as to align the retainer 80 within the housing 75.

Figure 12:
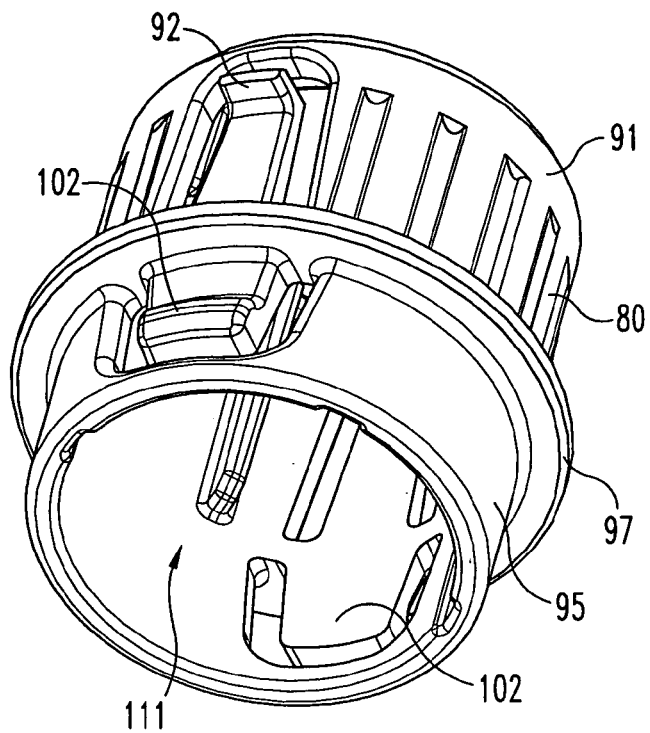
FIG. 12 is a bottom perspective view of a retainer used in the FIG. 1 dispenser.
Figure 13:
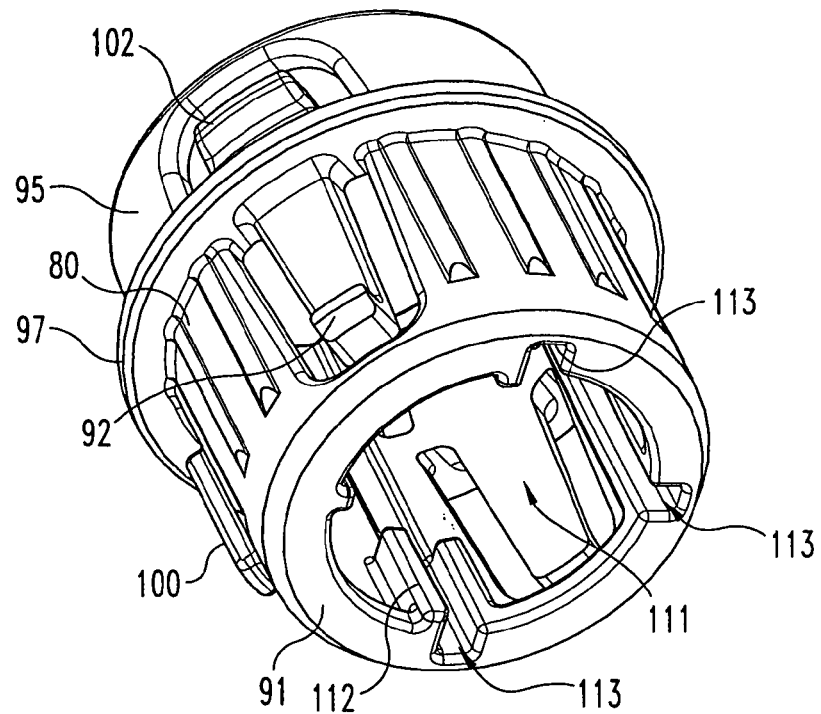
FIG. 13 is a top perspective view of the FIG. 12 retainer.
Figure 14:
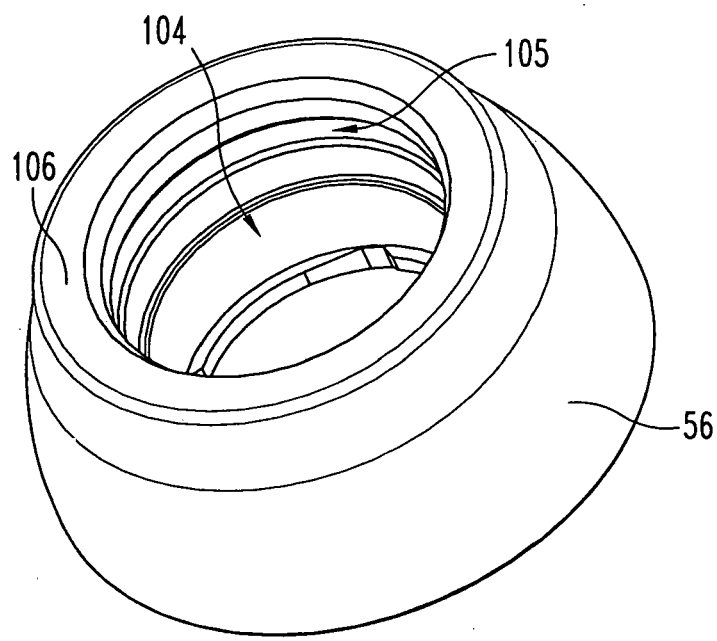
FIG. 14 is a perspective view of a base used in the FIG. 1 dispenser.
Figure 15:
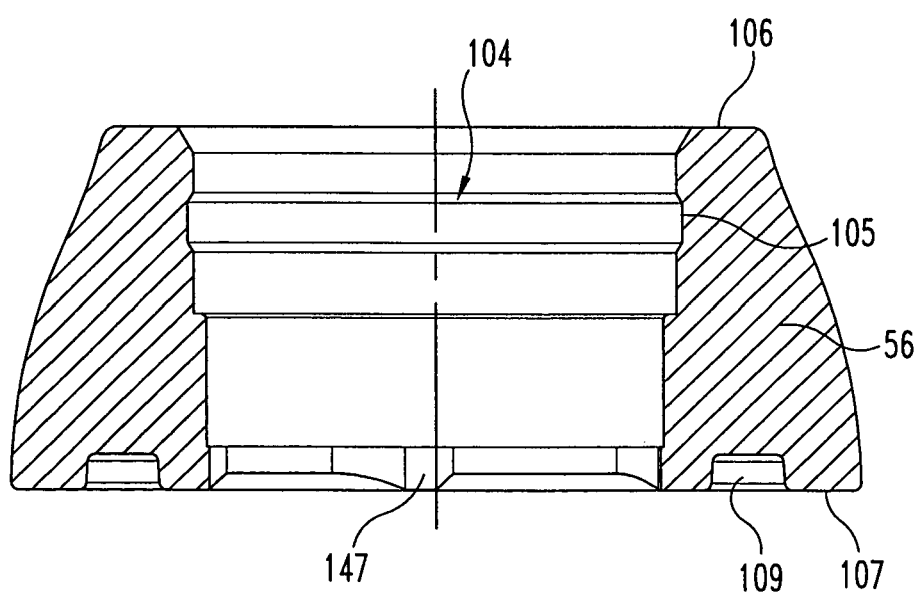
FIG. 15 is a cross-sectional view of the FIG. 14 base.

At the base end portion 95, the retainer 80 in FIGS. 12 and 13 has one or more retention clips or tabs 102 that detachably secure the dispenser body 53 to the base 56. In the illustrated embodiment, the retainer 80 has two retention clips 102, but it should be appreciated that the retainer 80 can include more or less retention clips 102 than is shown. Referring to FIGS. 14 and 15, the base 56 defines a retainer opening 104 in which the retainer 80 is received, and inside the retainer opening 104, the base 56 has a retention groove 105 to which the retention clips 102 are secured. As depicted, the base 56 has a body contact surface 106 against which the housing 75 of the dispenser body 53 abuts. With this configuration, the base 56 and the housing 75 can be sized so that a clean overall appearance can be provided at the interface between the base 56 and the housing 75. Opposite the body contact surface 106, the base 56 has a support surface 107 on which the base 56 rests against the mounting surface 60. The support surface 107 has a gasket cavity 109 in which the gasket 57 seals between the base 56 and the mounting surface 60.

Figure 17:
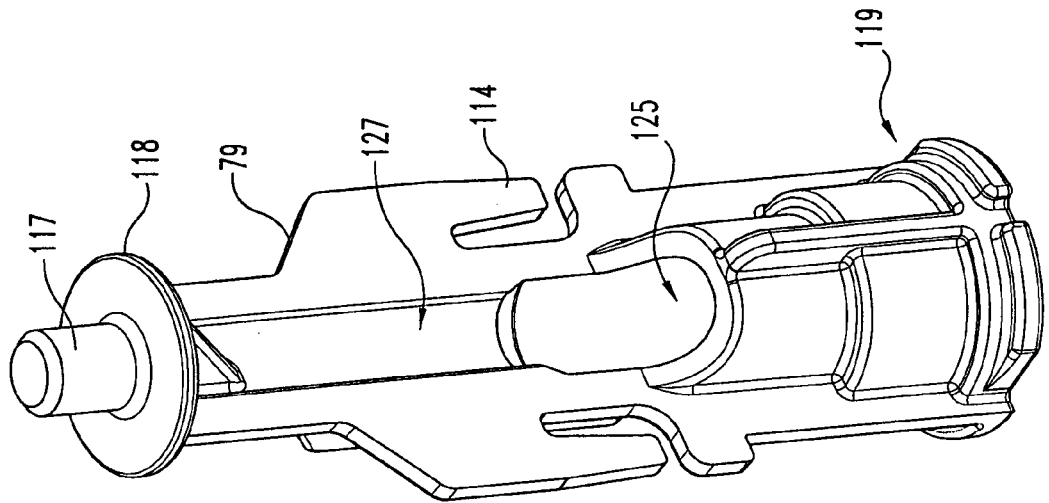
FIG. 17 is a front perspective view of the FIG. 16 insert.
Figure 16:
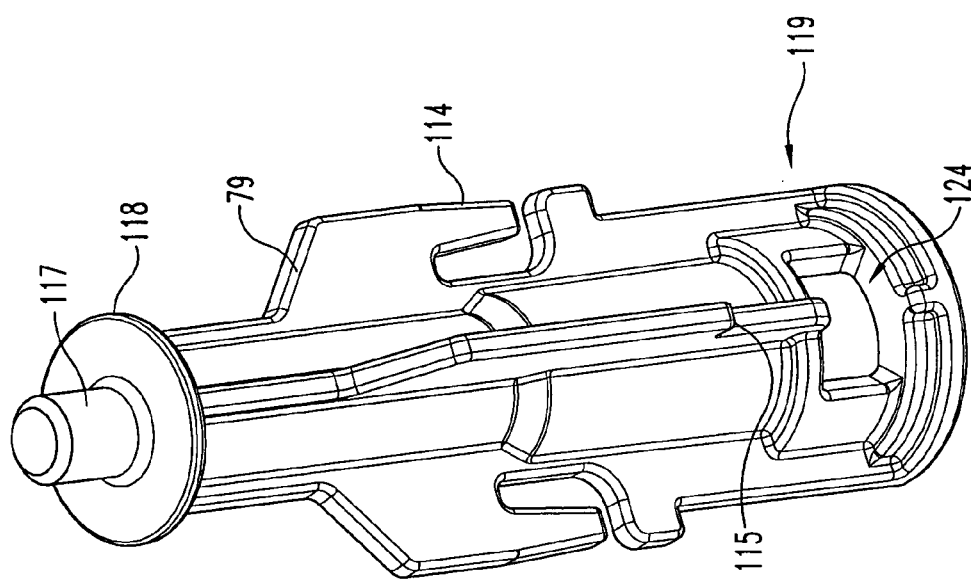
FIG. 16 is a rear perspective view of an insert used in the FIG. 1 dispenser.
Figure 18:
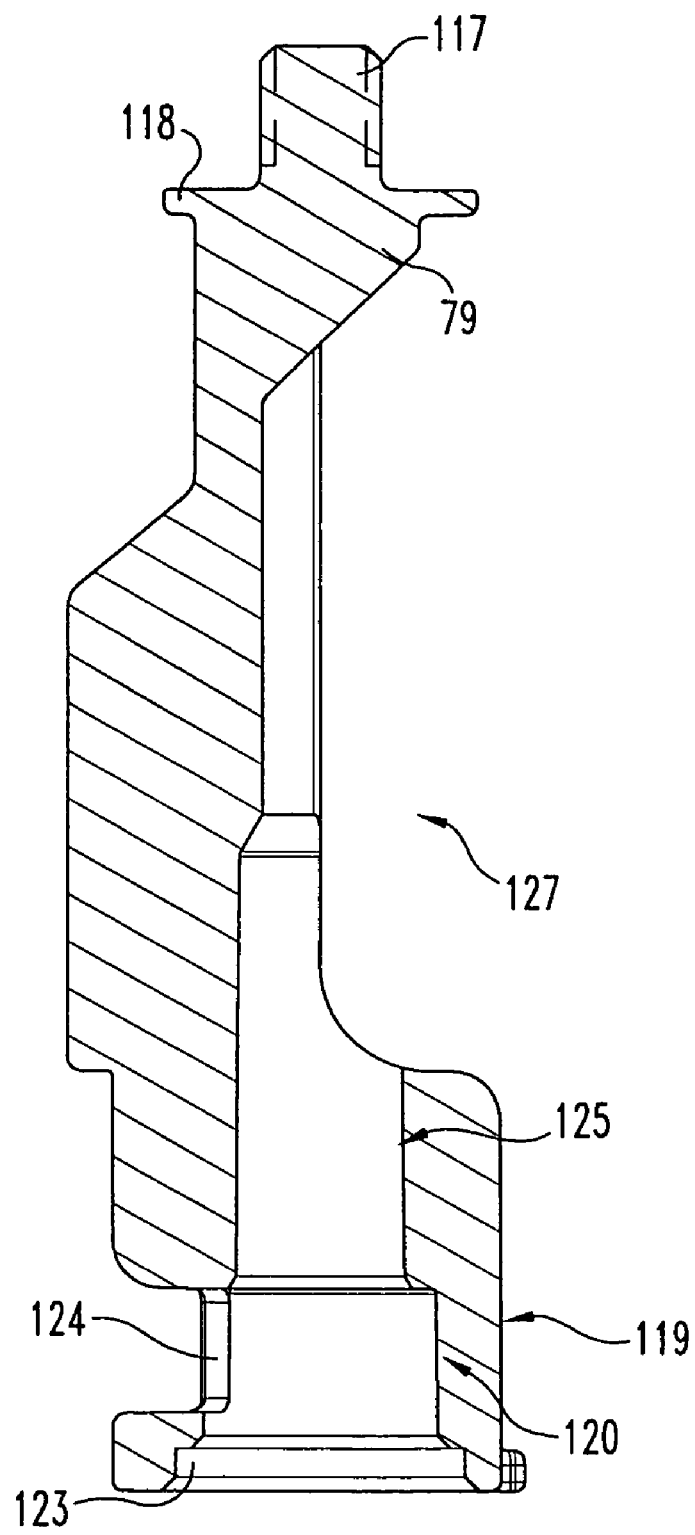
FIG. 18 is a cross-sectional view of the FIG. 16 insert.
Figure 19:
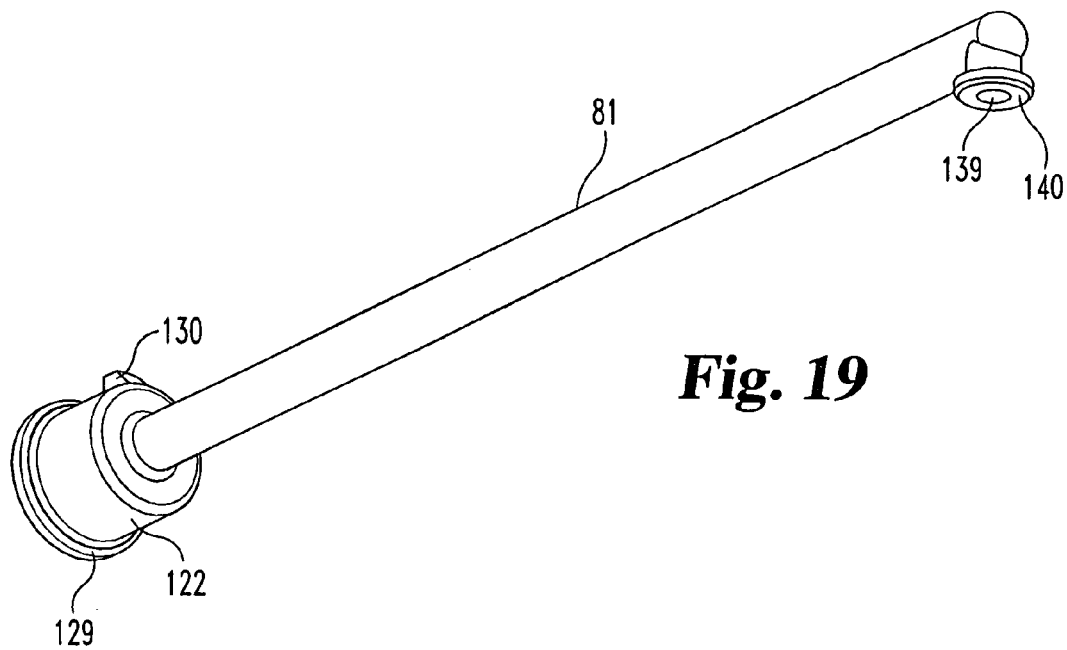
FIG. 19 is a perspective view of a dispenser tube used in the FIG. 1 dispenser.

Referring again to FIG. 13, the retainer 80 defines an insert cavity 111 in which the insert 79 is slidably disposed. Radially disposed around the insert cavity 111 at the housing end portion 91, the retainer 80 has a series of guide member 112 pairs that define guide slots 113 for guiding the insert 79. Looking at FIGS. 7 and 16, one or more guide arms 114 radially extend from the insert 79 and are received into the guide slots 113. The guide arms 114 direct the insert 79 so that the insert 79 moves in a general linear fashion when actuated and minimizes rotation of the insert 79. In the illustrated embodiment, the insert 79 has three guide arms 114, but it should be appreciated that the insert 79 in other embodiments can have more or less guide arms 114 than is shown. At least one of the guide arms 114 includes a stop tab 115 that limits the travel of the insert 79. During a compression or dispensing stroke, as depicted in FIG. 5, the stop tab 115 abuts against the connector 55, thereby limiting the travel of insert 79. In FIG. 17, the insert 79 includes a knob connection portion 117 that is threaded for connecting to the knob 84. Surrounding the knob connection portion 117, the insert 79 has a stop flange 118 that limits the travel of the insert 79 during the upward, intake stroke of the fluid dispenser 51 (FIG. 4). Opposite the knob connection portion 117, the insert 79 has a dispensing tube coupling portion 119 that is configured to secure one end of the dispensing tube 81. As illustrated in FIG. 18, the tube coupling portion 119 has a coupling cavity 120 that is shaped to receive a pump connector 122 of the dispensing tube 81 (FIG. 19). Inside the coupling cavity 120, the insert 79 has a tube retention groove 123 and a tube orientation notch 124 for retaining and aligning the dispensing tube 81. A tube passageway 125 extends between the coupling cavity 120 and a tube relief notch 127. When the dispenser 51 is assembled, as is illustrated in FIG. 4, the dispensing tube 81 extends through the tube passageway 125 and out the relief notch 127. The tube relief notch 127 permits movement of the dispensing tube 81 without kinking the tube 81 to the point where fluid flow is cut off as the dispenser 51 is actuated.

Figure 20:
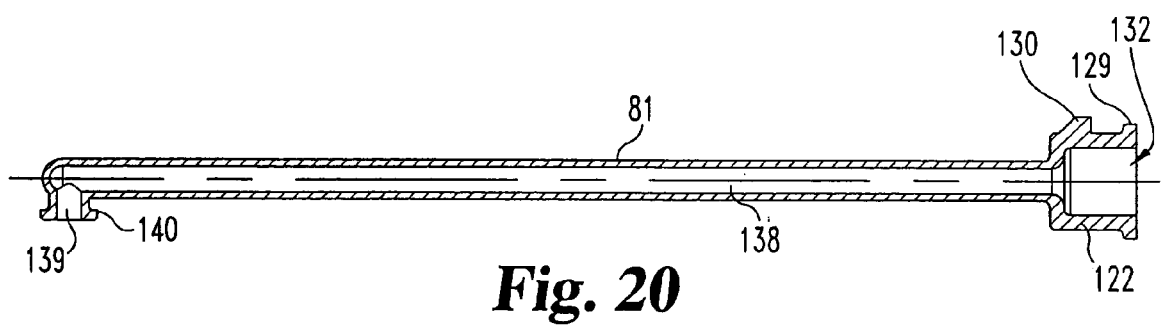
FIG. 20 is a cross-sectional view of the FIG. 19 dispenser tube.

As mentioned above, the pump connector 122 of the dispensing tube 81 is coupled inside the coupling cavity 120 of the insert 79. Referring to FIGS. 19 and 20, the pump connector 122 has an insert retention flange 129, which is received in the tube retention groove 123 of the insert 79, and a lock tab 130, which is received in the orientation notch 124 of the insert 79, for connecting the tube 81 to the insert 79. Looking at FIGS. 20 and 21, the pump connector 122 defines a pump head cavity 132 into which a head 133 of the pump 54 is connected. The dispensing tube 81 defines a fluid passageway 138 with an outlet 139 from which fluid is dispensed. In the illustrated embodiment, the outlet 139 extends in a general orthogonal manner with respect to the passageway 138, but it should be appreciated that the outlet 139 can extend at other angles. In the illustrated embodiment, the dispensing tube 81 has the outlet 139 surrounded by integral flange 140 that is larger than a spout outlet opening 141 in the housing 75 (FIG. 8). During assembly, as the end of the tube 81 with the flange 140 is pulled through the spout outlet opening 141, the flange 140 deflects. Once through the spout outlet opening 141, the flange 140 returns to its original shape so that the tube 81 can not be easily pulled out of the outlet opening 141 in the spout 76. It should be appreciated that the dispenser 51 can be assembled in other manners, however. In the illustrated embodiment, the dispensing tube is made of plastic, and in one embodiment, the dispensing tube 81 is made of material that is less prone to significant kinking that could possibly block fluid flow. In one form, the material ranges 50-80 Shore A durometer, and in another form, the tube 81 is 66 Shore A durometer.

Figure 21:
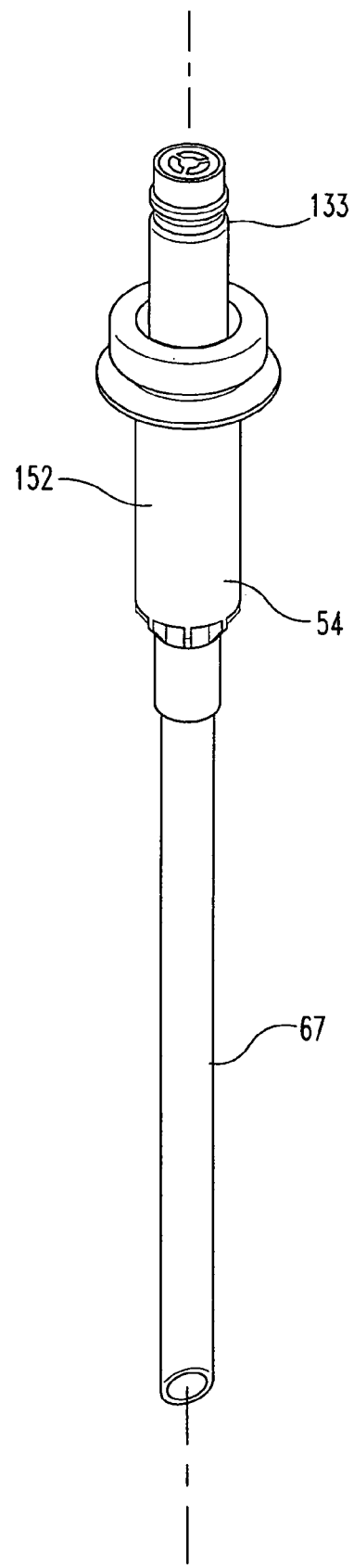
FIG. 21 is a perspective view of a pump mechanism used in the FIG. 1 dispenser.
Figure 22:
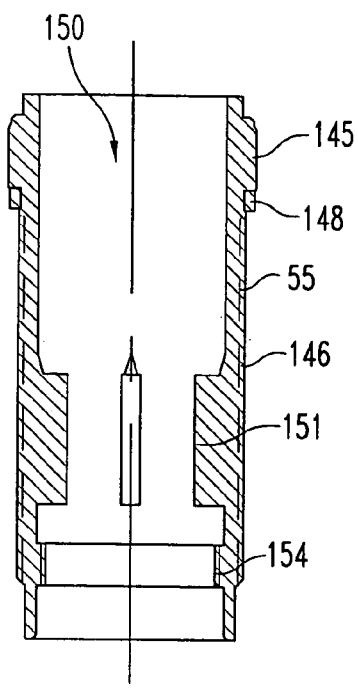
FIG. 22 is a cross-sectional view of a connector used in the FIG. 1 dispenser.
Figure 23:
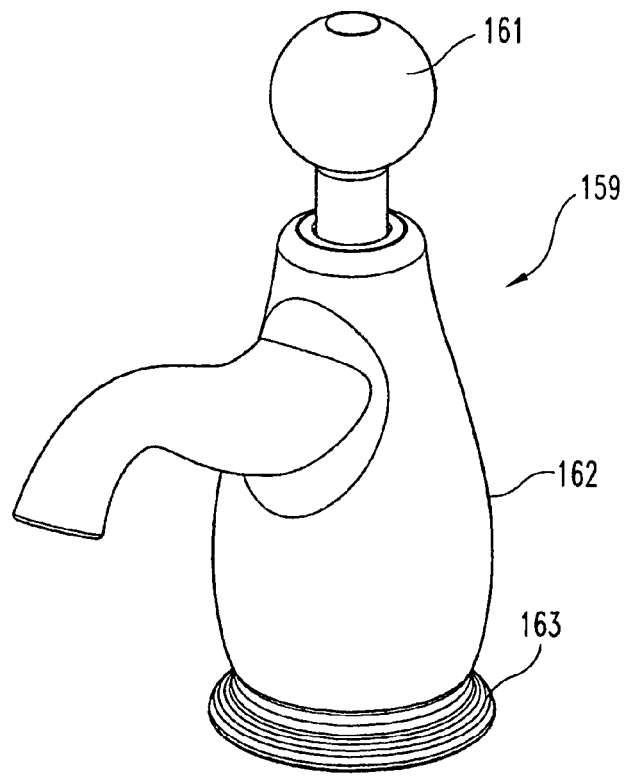
FIG. 23 is a perspective view of a fluid dispenser according to another embodiment.

As previously discussed, the connector 55 connects the base 56 to at least one of the nuts 58, 61 through the opening 64 in the mounting deck 60 such that the mounting deck 60 is clamped between the base 56 and the nut 58, 61. Referring to FIG. 22, the connector 55 has a head 145 that is sized so as to be retained in the base 56. The connector 55 further has an externally threaded portion 146 onto which the nut 58, 61 is threaded. As depicted in FIGS. 6 and 15, the base 56 has one or more anti-rotation tabs 147 that extend radially inward to engage and support the head 145 of the connector 55. The head 145 of the connector 55 in FIG. 22 includes one or more anti-rotation notches 148 that are configured to engage the tabs 147 in the base 56 so as to prevent the connector 55 from rotating as the nut 58, 61 is tightened. Inside, the connector 55 defines a connector cavity 150 in which one or more pump support tabs 151 that extend radially inwards so as to support the pump mechanism 54. The pump mechanism 54, as is shown in FIG. 21, has a pump body 152 that is located between the feed tube 67 and the pump head 133. The pump body 152 is sized to engage the pump support tabs 151 in the connector 55; while the feed tube 67 is configured to extend into the container 59 from between the pump support tabs 151. To pump the fluid, the pump head 133 moves in a telescoping fashion relative to the pump body 152. In one form, the pump mechanism 54 includes a bias spring for biasing the pump head 133 into an extended manner so as to refill the pump mechanism 54. As mentioned above, the pump mechanism 54 can includes pump mechanisms of the type as generally known to those skilled in the art and can include piston and check valves to pump the fluid, for example. In one form, the fluid is pumped during a compression stroke of the pump head 133, and in another embodiment, the fluid is pumped as the pump head 133 extends from the pump body 152. Extending inside the connector cavity 150, opposite the head 145, the connector 55 has a container engagement flange 154 where the neck 66 of the container 59 is secured. In the illustrated embodiment, the container engagement flange 154 is internally threaded so that the container 59 is screwed into the connector 55. As should be appreciated, the anti-rotation tabs 147 prevent the connector 55 from rotating as the container 59 is screwed into the connector 55. It is contemplated that the container 59 in other embodiments can be secured in other manners, however.

As mentioned before, the fluid dispenser assembly 51 allows the container 59 to be refilled from the top of the sink or countertop, as is depicted in FIG. 3. Once the container 59 is filled, the user can simply snap the dispenser body 53 onto the base 56 by pushing the retainer 80 into the retainer opening 104 in the base 56 until the retainer clips 102 engage the retainer groove 105 in the base (FIG. 6). To pump the fluid, the user in one embodiment pushes the knob 84 towards the dispenser body 53. As the knob 84 moves towards the dispenser body 53, the pump 54 is compressed between the insert 79 and the pump support tabs 151 in the connector 55. The pump head 133 moves into the pump body 152 thereby pumping fluid from the pump 54 and into the dispenser tube 81, which dispenses the fluid via the dispensing outlet 139. As noted above, the dispenser tube 81 is flexible so that the dispensing outlet 139 of the tube is able to remain at a fixed location while the rest of the tube 81 is able to move during pumping of the fluid. Once the user releases the knob 84, the spring inside the pump 54 extends the pump head 133 from the pump body 152, thereby drawing additional fluid from the container 59 into the pump 54. The user can repeatedly press on the knob 84 in order to dispense more fluid from the spout 76. To refill the container 59, the user pulls off the dispenser body 53 from the base 56 and fills the container 59 from the top side of the mounting deck 60, as is shown in FIG. 3. Afterwards, the dispenser body 53 is reattached to the base 56 in the manner as described above.

The configuration of the fluid dispenser 51 allows a large number of common components to be shared between different housing styles. For example, the insert 79, retainer 80 and dispensing tube 81 can be incorporated into a wide variety of housing styles. This flexibility in design allows the appearance of the fluid dispenser 51 to be quickly modified to account for changes in contemporary styles and tastes.

Figure 24:
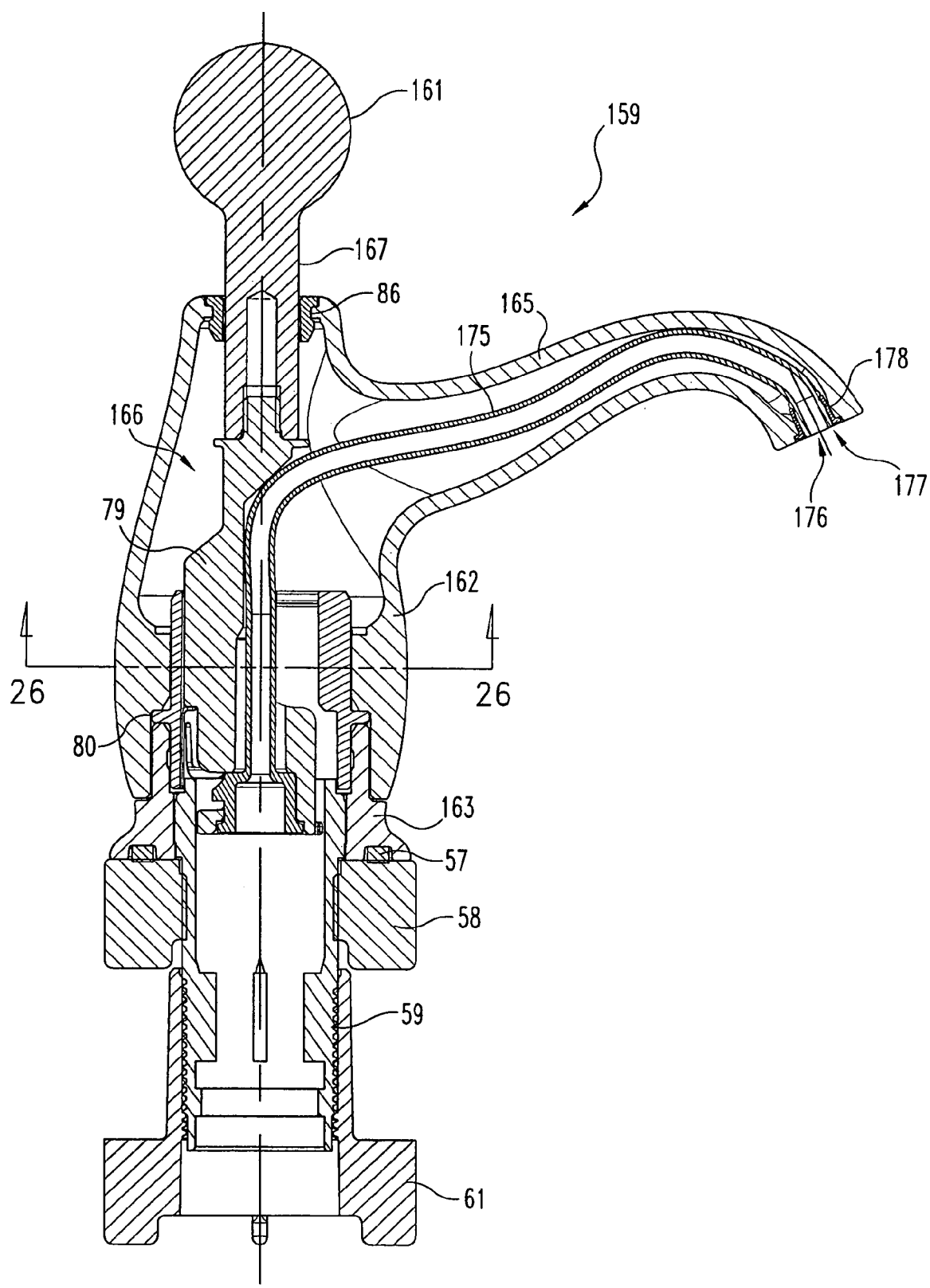
FIG. 24 is a first, side cross-sectional view of the FIG. 23 dispenser with a knob of the FIG. 23 dispenser in an extended position.
Figure 25:
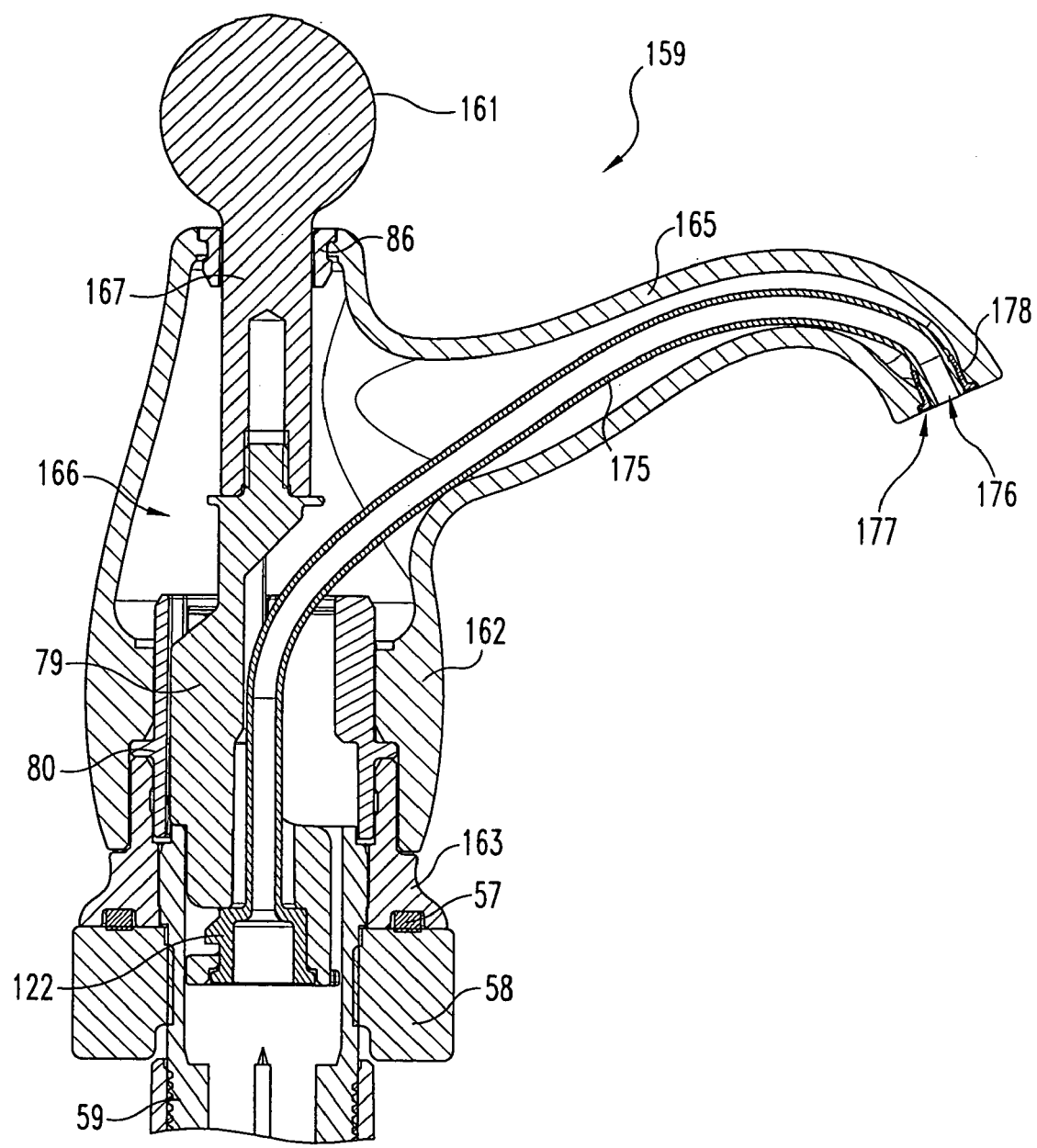
FIG. 25 is a second, side cross-sectional view of the FIG. 23 dispenser with the knob of in a retracted position.
Figure 26:
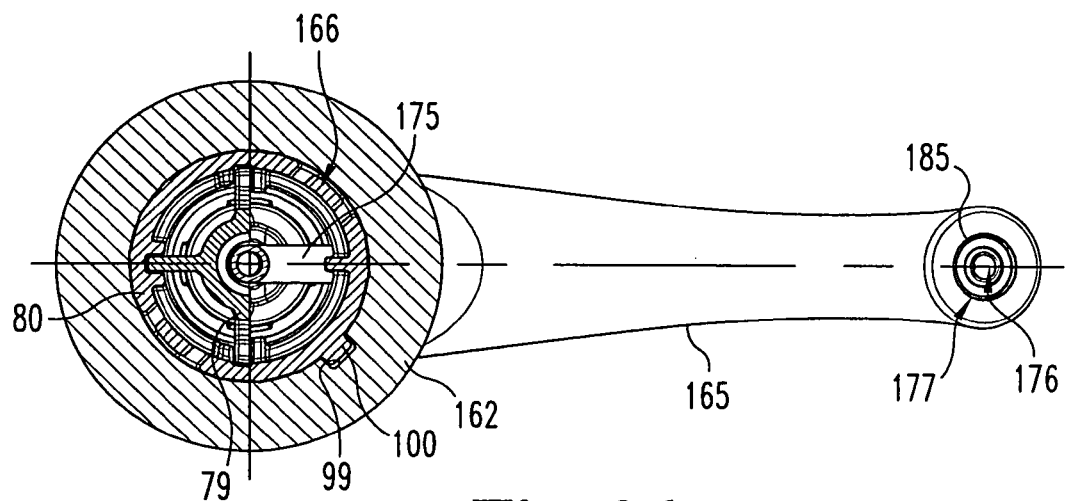
FIG. 26 is a bottom cross sectional view of the FIG. 23 dispenser.
Figure 27:
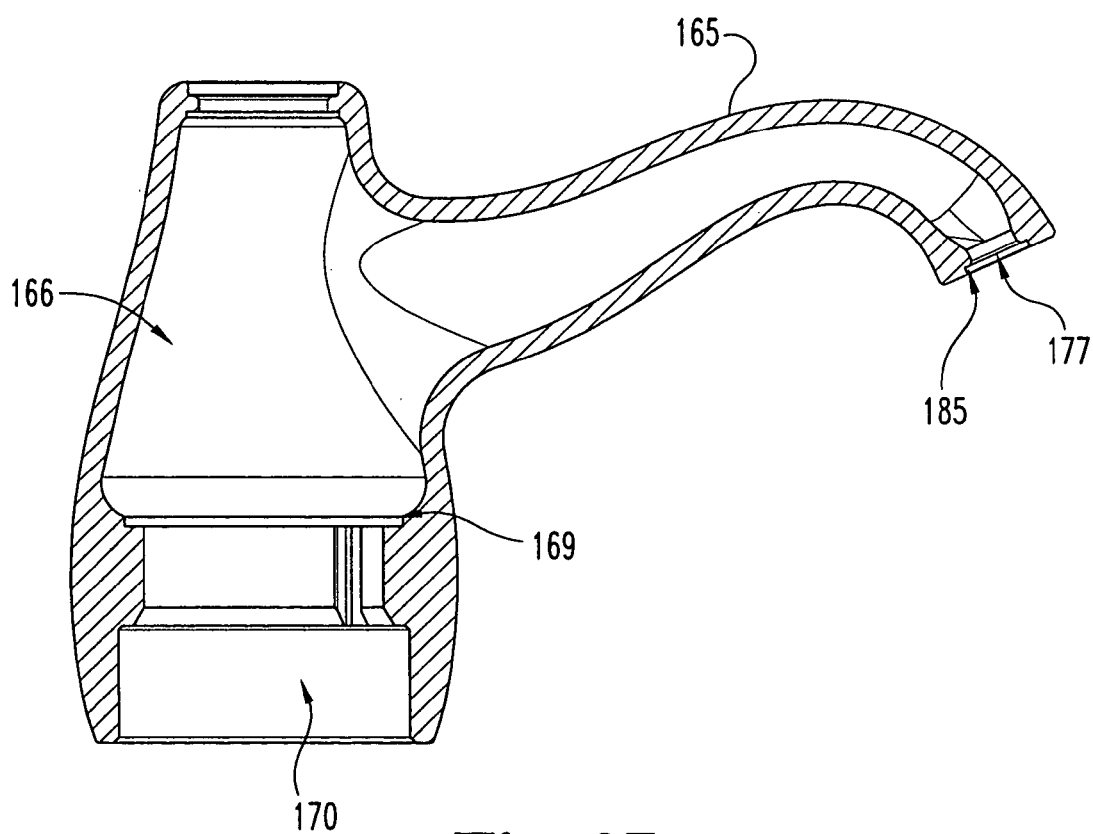
FIG. 27 is a side cross-sectional view of a housing for the FIG. 23 dispenser.

A fluid dispenser pump assembly 159 according to another embodiment of the present invention will now be described with reference to FIGS. 23, 24, 25 and 26. The fluid dispenser pump 159 in FIG. 23 shares a number of components in common with the one described above, and for the sake of clarity, as well as brevity, a detailed discussion of these common components will not be repeated below. As shown, the dispenser pump 159 includes an actuation knob or handle 161, a dispenser body 162 from which the actuation knob 161 extends, and a base 163 to which the dispenser body 162 is detachably coupled. In FIG. 24, the fluid dispenser 159 is illustrated with both nuts 58 and 61 attached to the connector 59, but it should be appreciated that typically in other embodiments only one type of nut is used to secure the fluid dispenser 159 to the mounting deck 60. With reference to FIGS. 24 and 25, the dispenser body 162 has a spout 165 that is configured to remain stationary as fluid is dispensed. The dispenser body 162 defines an internal cavity 166 in which retainer 80 is secured and insert 79 is slidably disposed. As shown, the knob 161 has a stem 167 threadedly secured to the insert 79. However, it should be appreciated that the knob 161 can be secured in other manners. The stem 167 slides through guide 86 that is attached to the dispenser body 162. Inside the internal cavity 166, the dispenser body 162 has orientation notch 99 that engages the orientation tab 100 on the retainer 80 so as to align the retainer 80 and the insert 79, as is depicted in FIG. 26. As illustrated in FIG. 27, the dispenser body 162 further has a retainer groove 169 to which the clip arms 92 of the retainer 80 are secured.

Figure 28:
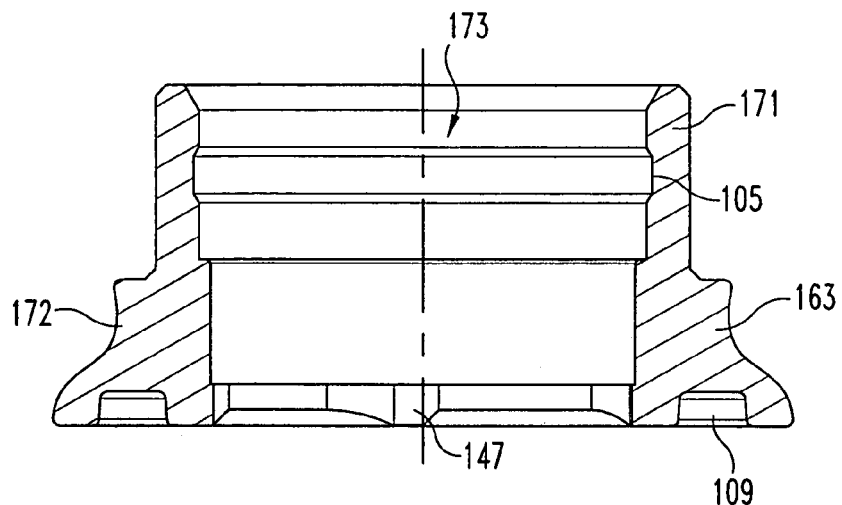
FIG. 28 is a cross-sectional view of a base used in the FIG. 23 dispenser.

With reference to FIGS. 27 and 28, the dispenser body 162 has a connection opening 170 that is sized to receive a connection flange 171 that extends from the base 163. As depicted in FIG. 28, the base 163 has a tapered portion 172 that is sized larger than the connection flange 171. The tapered portion 172 has a size that approximates the outside dimensions of the dispenser body 162 where the dispenser body 162 rests against the base 163 so that a clean and smooth transition appears between the dispenser body 162 and the base 163 (FIG. 25). The base 163 defines a retainer cavity 173 in which the retainer 80 is detachably coupled. In particular, the base 163 has retainer groove 105, and the retainer clips 102 of the retainer 80 are secured in the retainer groove 105. Like the previous embodiment, the base 163 has anti-rotation tabs 147 that minimize rotation of the connector 55 relative to the base 163 and gasket cavity 109 in which the gasket 57 is received.

Figure 29:
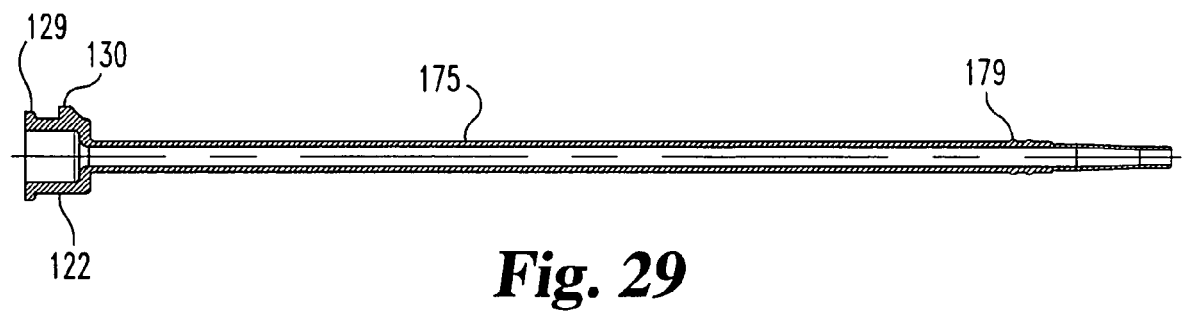
FIG. 29 is a cross-sectional view of a dispenser tube used in the FIG. 23 dispenser.
Figure 31:
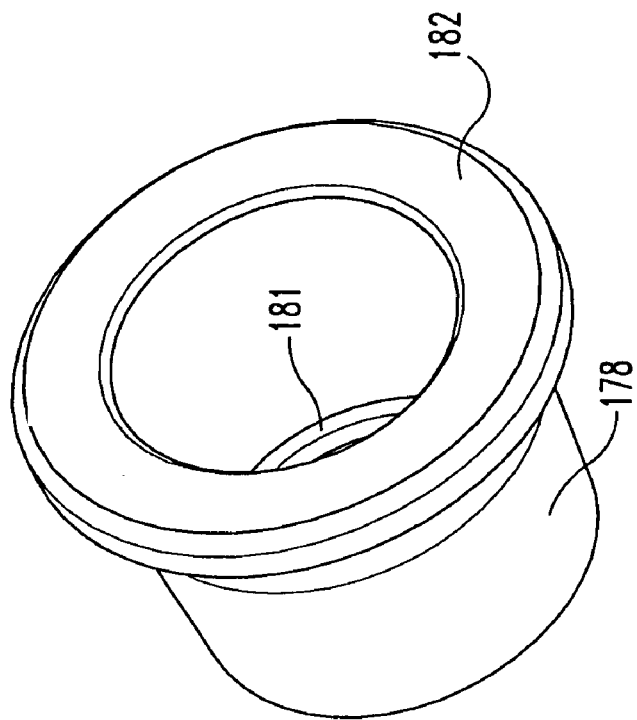
FIG. 31 is a perspective view of the FIG. 30 collar.
Figure 30:
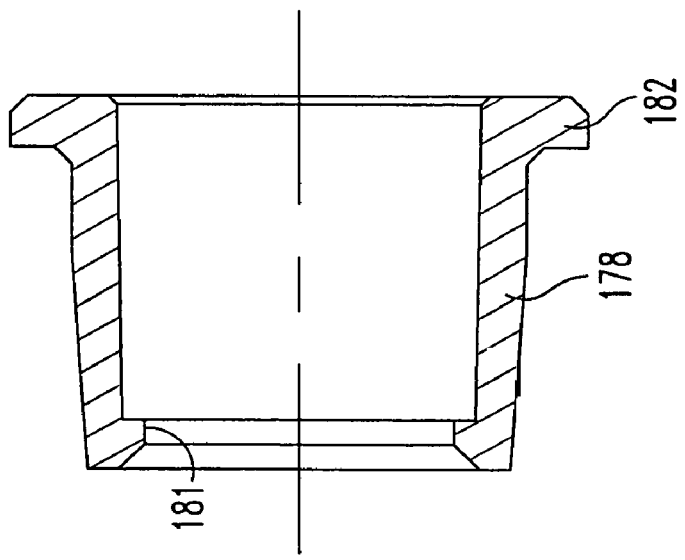
FIG. 30 is a cross-sectional view of a collar for retaining the FIG. 29 dispenser tube in the FIG. 23 dispenser.

Referring again to FIG. 25, the fluid dispenser 159 includes a dispensing tube or liner 175 that transports fluid from the pump 54 to the spout 165 for dispensing the fluid. The pump mechanism 54 is installed in the same manner as was described above with reference to the fluid dispenser 51 of FIG. 1. At one end, the dispensing tube 175 has pump connector 122 that is configured to connect with the pump mechanism 54 as well as the insert 79. Similar to the previous embodiment, the pump connector 122 of the dispensing tube 175 in FIG. 29 has the insert retention flange 129 and the lock tab 130 that engage the insert 79 in the same fashion as described above. At the end opposite the connector 122, the dispensing tube 175 has a dispenser opening 176 for dispensing fluid. The dispensing tube 175 is secured to an outlet opening 177 of the spout 165 via a tube retainer or collar 178. Near the dispenser opening 176, the dispensing tube 175 has one or more retention ridges 179 (FIG. 29) onto which the tube collar 178 is secured. In the illustrated embodiment, the dispensing tube 175 has two retention ridges 179, but it should be appreciated that the dispensing tube 175 can include more or less ridges than is shown. As illustrated in FIGS. 30 and 31, the tube collar 178 has at one end a ridge engagement flange 181 that extends radially inwards to engage one of the ridges 179 on the dispensing tube 175. At the opposite end, the tube collar 178 has a spout engagement flange 182 that extends radially outwards to engage the spout 165. Around the outlet opening 177, the spout 165 has a recess 185 sized to receive the spout engagement flange 182 such that the tube collar 178 is flush with the end of the spout 165, as is illustrated in FIGS. 26 and 27.

During assembly, the end of the tube 175 that is opposite the pump connector 122 is pulled through the outlet opening 177 of the spout 165 so that the retention ridges 179 are exposed. The tube collar 178 is slid over the end of the tube 175 and secured to the ridges 179 via the ridge engagement flange 181. After the dispensing tube 175 is secured, the excess portion of the dispensing tube 175 that extends past the outlet opening 177 can be cut so as to create the dispensing opening 176 for the tube 175. Once secured, the tube collar 178 reduces the chance that the end of the tube 175 can be pulled out of the outlet opening 177 in the spout 165. Nevertheless, it is contemplated that the fluid dispenser 159 can be assembled in other manners.

Once installed, the fluid dispenser 159 allows the container 59 to be refilled from the top of the sink or other mounting surface. To refill the fluid dispenser 159, the user pulls on the dispenser body 162 so as to detach the dispenser body 162 from the base 163. The user can then refill the container 59 from the top side of the sink, and afterwards, the dispenser body 162 can be reattached to the base 163 by inserting and pressing the retainer 80 into base 163. In one embodiment, the fluid is pumped from the dispenser 159 by pressing on the knob 161 so that the pump head 133 is compressed, thereby supplying fluid to the dispenser tube 175. It is envisioned that, in other embodiments, the fluid can be dispensed by pulling on the knob 161. FIGS. 24 and 25 show the knob 161 in extended and retracted positions, respectively, when fluid is dispensed.

Besides for refilling the fluid, the dispenser body 162 can be detached from the base 163 for any number of reasons, such as for cleaning the dispenser 159 and/or the area surrounding the dispenser 159. As mentioned before, to remove the dispenser body 162, the body 162 of the dispenser 159 is manually pulled from the base 163 so that the retention clips 102 disengage from the retention groove 105 in the base 163. Once removed, the dispenser 159 can be thoroughly cleaned or replaced with a different one, if so desired. To reattach the dispenser body 162, the body 162 is pushed onto the base 163 so that the retention clips 102 on the retainer 80 engage the groove 105 inside the base 163. When the dispenser body 162 is detached from the base 163, a decorative object or other types of objects can be coupled to the base 163 so as to cover the cavity 173 in the base 163. By covering the base 163, a more aesthetically pleasing environment is provided as well as a safer and cleaner environment because objects are unable to fall into the base 163.

Figure 32:
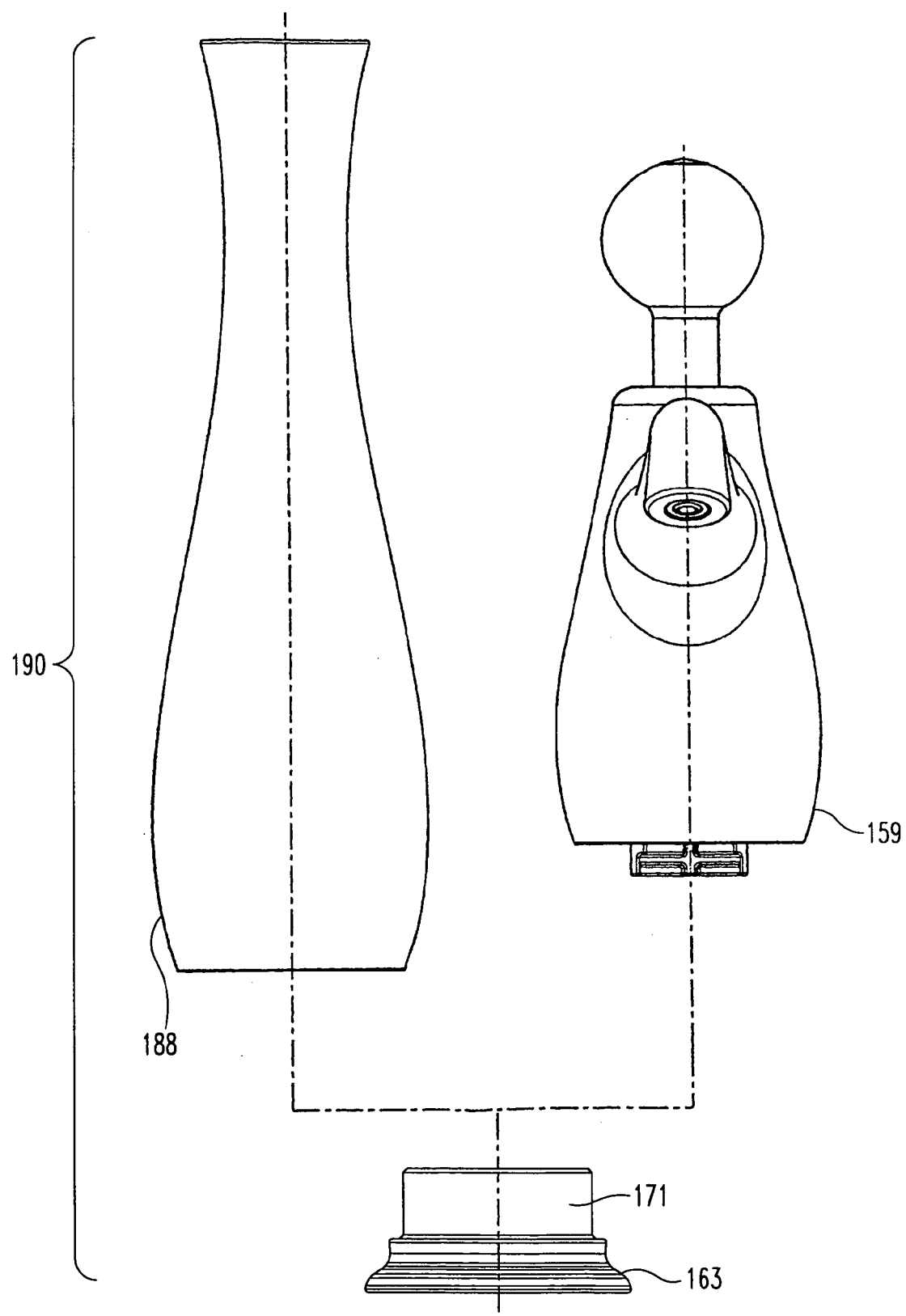
FIG. 32 is an exploded view of a kit that incorporates the FIG. 23 dispenser and a vase.

In the embodiment illustrated in FIG. 32, the object for covering the base 163 includes a decorative vase 188. It is contemplated that other types of objects, such as bottles, decorative figures, sculptures, signs, fixtures, products and the like, can be likewise coupled to the base 163. The vase 188 along with the dispenser 159, including the base 163 as well as the other components of the dispenser 159, can be supplied as a kit 190. It should be appreciated, however, that the vase 188 or other objects can be supplied and/or sold separately so that the user can customize the style to their own tastes. For example, the user can purchase a differently styled vase or sculpture for different seasons or holidays throughout the year. For instance, the vase 188 can be replaced with a sculpture of a jack-o-lantern during Halloween or a sculpture of a turkey during Thanksgiving. Moreover, the vase 188 can be shaped differently in other embodiments.

Figure 33:
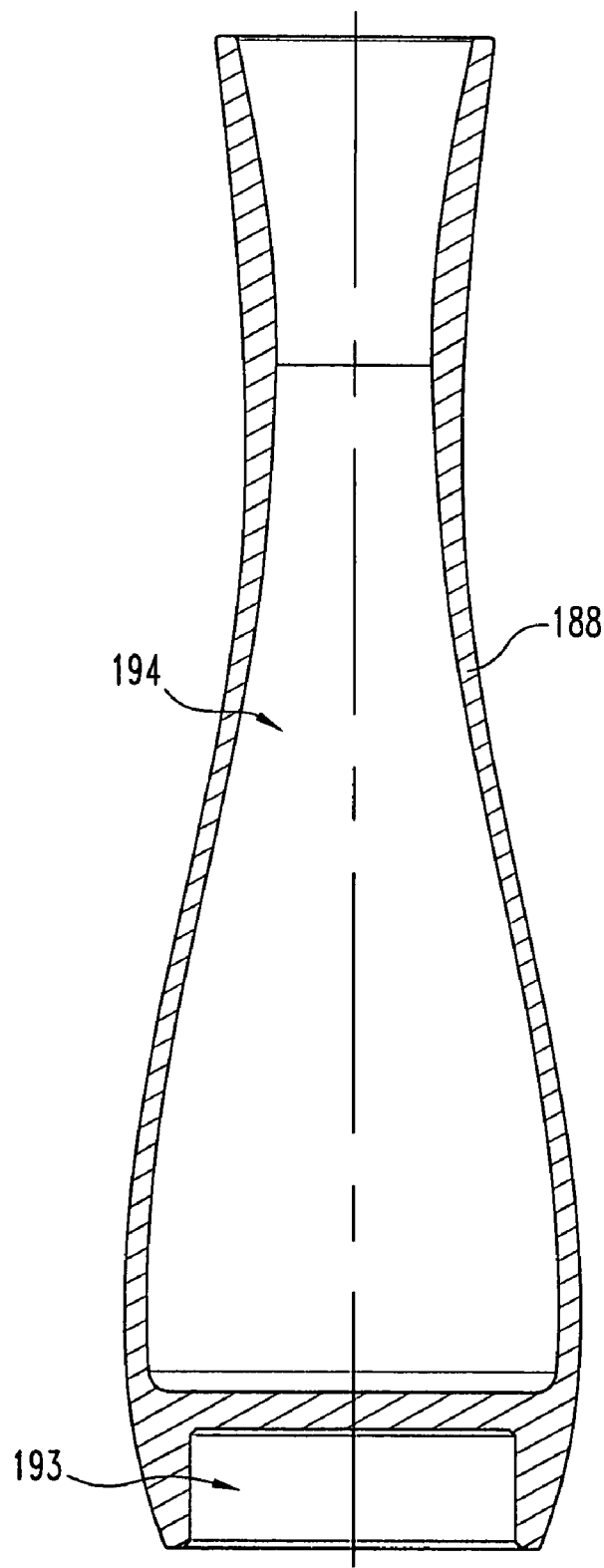
FIG. 33 is a cross-sectional view of the vase illustrated in FIG. 32.
Figure 34:
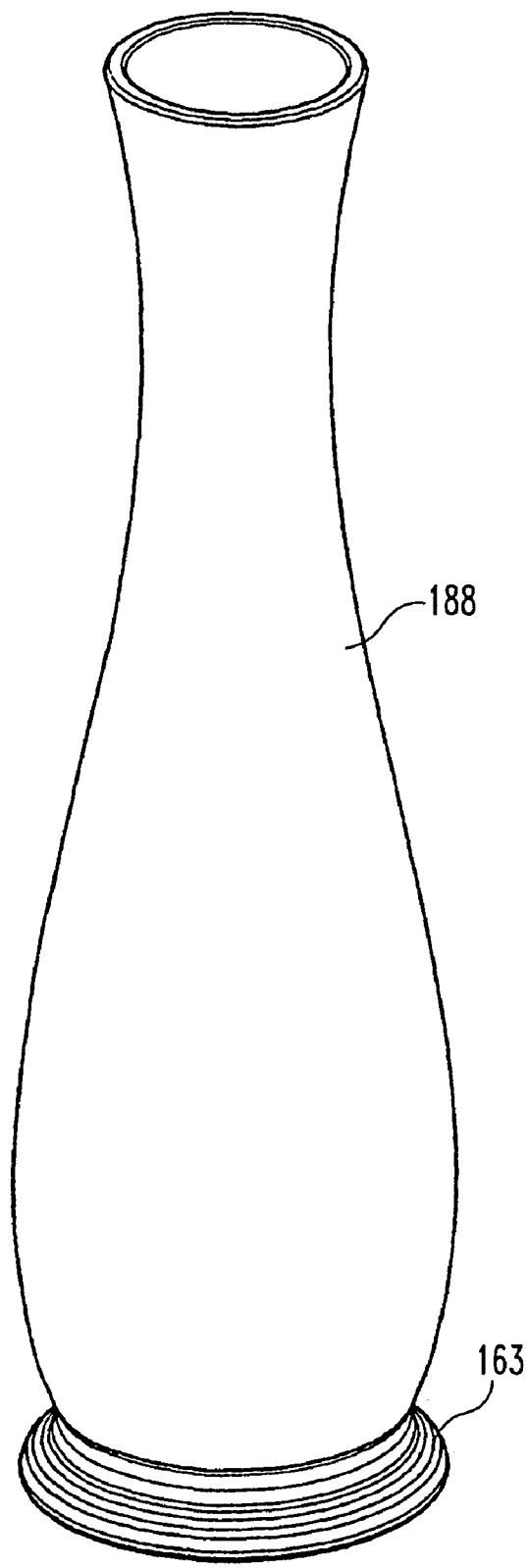
FIG. 34 is a perspective view of the vase illustrated in FIG. 32 when mounted.

Referring to FIG. 33, the vase 88 is configured to couple to the base 163 so that the vase 188 is not easily dislodged. This reduces the risk that the vase 188 will be tipped over, which can result in items, such as glassware or plates, being broken. As shown, the vase 188 has a base receptacle or opening 193 that is configured and sized to receive the connection flange 171 on the base 163. Opposite the base receptacle 193, the vase 188 has a vessel cavity 194 in which items, such as flower can be held. In the illustrated embodiment, the base receptacle 193 and flange 171 on the base 163 are generally cylindrical in shape, but it should be appreciated that the receptacle 193 and the flange 171 can be shaped differently in other embodiments. Once coupled, the engagement between the connection flange 171 in the base 163 and the receptacle 193 in the vase 188 reduces the chance that the vase 188 will be tipped over or dropped into the sink, for example. As depicted in FIG. 33, the outer contour of the vase 188 around the receptacle 193 is sized to correspond with the size of the base 163 where the two meet so as to provide a smooth transition between the base 163 and the vase 188. As should be appreciated, the vase 188 can be secured to the base 163 in other manners. For example, the vase 188 can incorporate retainer clips 102, like those in the fluid dispenser 159, so that the vase 188 can be firmly secured to the base 163.

In the embodiments described above, the base is illustrated as a component separate from the mounting deck, but it is envisioned that the base in other embodiments can be made integral to the mounting deck such that the dispenser body is detachably coupled directly to the mounting deck. By having the body of the dispenser remain at a fixed position during dispensing, the outer styling of the dispenser can be smoother and much cleaner in appearance than in other types of dispensers. Moreover, as mentioned before, the fluid dispensers described above are designed to provide greater flexibility in manufacturing and design so that common core components can be shared among a wide variety of dispenser styles. This flexibility in design and manufacturing allows the appearance of the fluid dispenser to be quickly modified to account for changes in contemporary tastes. In addition, the dispenser bodies in the illustrated embodiments each has an internal cavity that is sized and shaped to allow for movement of the dispensing tube without the dispensing tube becoming kinked to the point where fluid flow is prevented.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A fluid dispenser system, comprising:
a container mounted below a mounting surface for containing a fluid;
a base mounted above the mounting surface, the base defining an opening configured to allow passage of the fluid when filling the container, the base having a retention groove defined in the opening in the base;
a dispenser body detachably coupled to the base to allow removal of the dispenser for filling the container with the fluid from above the mounting surface, the dispenser body having a moveable handle that is moveable for manually pumping the fluid and a fixed spout that is fixed in position relative to the mounting surface when the fluid is dispensed from the spout, the dispenser body including a retainer configured to detachably couple the dispenser body to the base; the retainer including one or more retention clips detachably coupled to the retention groove in the base;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion; and the dispensing tube being flexible to flex as the pump connector moves with the pump head and the outlet opening remains at the fixed location.

2. A fluid dispenser system, comprising:

a container mounted below a mounting surface for containing a fluid;

a base mounted above the mounting surface, the base defining an opening configured to allow passage of the fluid when filling the container;

a dispenser body detachably coupled to the base to allow removal of the dispenser for filling the container with the fluid from above the mounting surface, the dispenser body having a moveable handle that is moveable for manually pumping the fluid and a fixed spout tat is fixed in position relative to the mounting surface when the fluid is dispensed from the spout, the dispenser body including a retainer configured to detachably couple the dispenser body to the base, and the dispenser body including a housing that defines an internal cavity with a clip arm groove defined inside the internal cavity; and the retainer includes one or more clip arms engaged to the clip arm groove;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion; and the dispensing tube being flexible to flex as the pump connector moves with the pump head and the outlet opening remains at the fixed location.

3. The system of claim 2, wherein:

the housing defines an orientation notch; and the retainer has an orientation tab received in the orientation notch.

4. A fluid dispenser system, comprising:

a container mounted below a mounting surface for containing a fluid;

a base mounted above the mounting surface, the base defining an opening configured to allow passage of the fluid when filling the container;

a dispenser body detachably coupled to the base to allow removal of the dispenser for filling the container with the fluid from above the mounting surface, the dispenser body having a moveable handle that is moveable for manually pumping the fluid and a fixed spout that is fixed in position relative to the mounting surface when the fluid is dispensed from the spout, the dispenser body includes a retainer configured to detachably couple the dispenser body to the base;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid, wherein the insert is slidably coupled to the retainer;

the retainer defines one or more guide slots; and the insert has one or more guide arms slidably disposed in the guide slots;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion; and the dispensing tube being flexible to flex as the pump connector moves with the pump head and the outlet opening remains at the fixed location.

5. A fluid dispenser system, comprising:

a container mounted below a mounting surface for containing a fluid;

a base mounted above the mounting surface, the base defining an opening configured to allow passage of the fluid when filling the container;

a dispenser body detachably coupled to the base to allow removal of the dispenser for filling the container with the fluid from above the mounting surface, the dispenser body having a moveable handle that is moveable for manually pumping the fluid and a fixed spout that is fixed in position relative to the mounting surface when the fluid is dispensed from the spout, the dispenser body defining a connection opening;

the base having a connection flange received in the connection opening when the fluid is dispensed from the spout;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion; and the dispensing tube being flexible to flex as the pump connector moves with the pump head and the outlet opening remains at the fixed location.

6. The system of claim 5, further comprising a decorative vase defining a receptacle configured to receive the connection flange of the base when the dispenser body is removed from the base.

7. A fluid dispenser system, comprising:

a container mounted below a mounting surface for containing a fluid;

a base mounted above the mounting surface, the base defining an opening configured to allow passage of the fluid when filling the container;

a dispenser body detachably coupled to the base to allow removal of the dispenser for filling the container with the fluid from above the mounting surface, the dispenser body having a moveable handle that is moveable for manually pumping the fluid and a fixed spout that is fixed in position relative to the mounting surface when the fluid is dispensed from the spout;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion; and the dispensing tube being flexible to flex as the pump connector moves with the pump head and the outlet opening remains at the fixed location, and the dispensing tube including an integral flange to secure the dispensing tube to the spout.

8. A fluid dispenser system, comprising:

a container mounted below a mounting surface for containing a fluid;

a base mounted above the mounting surface, the base defining an opening configured to allow passage of the fluid when filling the container;

a dispenser body detachably coupled to the base to allow removal of the dispenser for filling the container with the fluid from above the mounting surface, the dispenser body having a moveable handle that is moveable for manually pumping the fluid and a fixed spout that is fixed in position relative to the mounting surface when the fluid is dispensed from the spout;

the spout defining an outlet from where the fluid is dispensed;

a pump mechanism including a pump head and a pump body with a feed tube extending in the container, the pump head configured to move in a telescoping fashion relative to the pump body for pumping the fluid;

an insert coupled between the handle and the pump mechanism to transfer movement of the handle to the pump mechanism for pumping the fluid;

a dispensing tube configured to transport the fluid from the pump mechanism to the outlet of the spout, the dispensing tube including an outlet opening secured to the outlet of the spout to remain at a fixed location when the fluid is dispensed, and a pump connector connected to the pump head, the pump connector being moveable with the pump head as the pump head moves in the telescoping fashion;

the dispensing tube being flexible to flex as the pump connector moves with the pump head and the outlet opening remains at the fixed location;

and a funnel for filling the fluid through the opening in the base, wherein the funnel includes one or more ribs for venting the container when the fluid is filled.

9. A fluid dispenser, comprising:

a housing with a fixed spout for dispensing fluid, wherein the housing defines an internal cavity, the housing having a retainer groove defined inside the internal cavity, the fixed spout being fixed in position relative to a mounting surface when the fluid is dispensed from the spout;

a retainer coupled inside the internal cavity to the housing, wherein the retainer includes at least one retention clip for securing the retainer to a base, the retainer including at least one clip arm clipped to the retainer groove to permit the retainer to be installed into other housing styles;

a handle extending from the housing, wherein the handle is moveable relative to the housing for manually dispensing the fluid;

an insert slidably coupled to the retainer; the insert including a tube coupling portion;

a dispensing tube coupled between the tube coupling portion of the insert and the spout of the housing, the tube being flexible to permit movement of the dispensing tube inside the internal cavity as the handle is moved;

a pump mechanism coupled to the dispensing tube at the coupling portion of the insert for supplying the fluid to the spout via the dispensing tube, wherein the insert transmits the movement of the handle to actuate the pump mechanism;

the pump mechanism including a pump head and a pump body with a feed tube, the pump head configured to move in a telescoping fashion relative to the pump body; and the dispensing tube including an outlet opening secured to the fixed spout to remain at a fixed location as the handle is moved, and a pump connector connected to the pump head, the pump connector being moveable with the pump head as the pump head moves in the telescoping fashion.

10. A fluid dispenser, comprising:

a housing with a fixed spout for dispensing fluid, wherein the housing defines an internal cavity, the fixed spout being fixed in position relative to a mounting surface when the fluid is dispensed from the spout;
a retainer coupled inside the internal cavity to the housing, wherein the retainer includes at least one retention clip for securing the retainer to a base, the retainer defining at least one guide slot;
a handle extending from the housing, wherein the handle is moveable relative to the housing for manually dispensing the fluid;
an insert slidably coupled to the retainer, the insert including a tube coupling portion, the insert having at least one guide arm slidably disposed in the guide slot;
a dispensing tube coupled between the tube coupling portion of the insert and the spout of the housing, the tube being flexible to permit movement of the dispensing tube inside the internal cavity as the handle is moved;
a pump mechanism coupled to the dispensing tube at the coupling portion of the insert for supplying the fluid to the spout via the dispensing tube, wherein the insert transmits the movement of the handle to actuate the pump mechanism;
the pump mechanism including a pump head and a pump body with a feed tube, the pump head configured to move in a telescoping fashion relative to the pump body; and the dispensing tube including
 an outlet opening secured to the fixed spout to remain at a fixed location as the handle is moved, and
 a pump connector connected to the pump head, the pump connector being moveable with the pump head as the pump head moves in the telescoping fashion.

11. A fluid dispenser, comprising:
a housing with a fixed spout for dispensing fluid, wherein the housing defines an internal cavity, the fixed spout being fixed in position relative to a mounting surface when the fluid is dispensed from the spout;
a base;
a retainer coupled inside the internal cavity to the housing, wherein the retainer includes at least one retention clip for securing the retainer to the base, the base including a retainer groove to which the retention clip of the retainer is secured for permitting detachment of the housing from the base;
a handle extending from the housing, wherein the handle is moveable relative to the housing for manually dispensing the fluid;
an insert slidably coupled to the retainer, the insert including a tube coupling portion;
a dispensing tube coupled between the tube coupling portion of the insert and the spout of the housing, the tube being flexible to permit movement of the dispensing tube inside the internal cavity as the handle is moved;
a pump mechanism coupled to the dispensing tube at the coupling portion of the insert for supplying the fluid to the spout via the dispensing tube, wherein the insert transmits the movement of the handle to actuate the pump mechanism;
the pump mechanism including a pump head and a pump body with a feed tube, the pump head configured to move in a telescoping fashion relative to the pump body; and
the dispensing tube including
 an outlet opening secured to the fixed spout to remain at a fixed location as the handle is moved, and
 a pump connector connected to the pump head, the pump connector being moveable with the pump head as the pump head moves in the telescoping fashion.

12. A fluid dispenser, comprising:
a housing with a fixed spout for dispensing fluid, wherein the housing defines an internal cavity, the fixed spout being fixed in position relative to a mounting surface when the fluid is dispensed from the spout;
a retainer coupled inside the internal cavity to the housing, wherein the retainer includes at least one retention clip for securing the retainer to a base;
a handle extending from the housing, wherein the handle is moveable relative to the housing for manually dispensing the fluid;
an insert slidably coupled to the retainer, the insert including a tube coupling portion;
a dispensing tube coupled between the tube coupling portion of the insert and the spout of the housing, the tube being flexible to permit movement of the dispensing tube inside the internal cavity as the handle is moved, the dispensing tube including an integral flange securing the dispensing tube to the spout;
a pump mechanism coupled to the dispensing tube at the coupling portion of the insert for supplying the fluid to the spout via the dispensing tube, wherein the insert transmits the movement of the handle to actuate the pump mechanism;
the pump mechanism including a pump head and a pump body with a feed tube, the pump head configured to move in a telescoping fashion relative to the pump body; and
the dispensing tube including
 an outlet opening secured to the fixed spout to remain at a fixed location as the handle is moved, and
 a pump connector connected to the pump head, the pump connector being moveable with the pump head as the pump head moves in the telescoping fashion.

13. A fluid dispenser, comprising:
a housing with a fixed spout for dispensing fluid, wherein the housing defines an internal cavity, the fixed spout being fixed in position relative to a mounting surface when the fluid is dispensed from the spout;
a retainer coupled inside the internal cavity to the housing, wherein the retainer includes at least one retention clip for securing the retainer to a base;
a handle extending from the housing, wherein the handle is moveable relative to the housing for manually dispensing the fluid;
an insert slidably coupled to the retainer, the insert including a tube coupling portion;
a dispensing tube coupled between the tube coupling portion of the insert and the spout of the housing, the tube being flexible to permit movement of the dispensing tube inside the internal cavity as the handle is moved, the dispensing tube including a retention ridge;
a collar engaged to the retention ridge to couple the dispensing tube to the spout;
a pump mechanism coupled to the dispensing tube at the coupling portion of the insert for supplying the fluid to the spout via the dispensing tube, wherein the insert transmits the movement of the handle to actuate the pump mechanism;
the pump mechanism including a pump head and a pump body with a feed tube, the pump head configured to move in a telescoping fashion relative to the pump body; and
the dispensing tube including
 an outlet opening secured to the fixed spout to remain at a fixed location as the handle is moved, and a pump connector connected to the pump head, the pump connector being moveable with the pump head as the pump head moves in the telescoping fashion.

14. A fluid dispenser, comprising:
a housing with a fixed spout for dispensing fluid, wherein the housing defines an internal cavity, the fixed spout being fixed in position relative to a mounting surface when the fluid is dispensed from the spout;
a retainer coupled inside the internal cavity to the housing, wherein the retainer includes at least one retention clip for securing the retainer to a base;
a handle extending from the housing, wherein the handle is moveable relative to the housing for manually dispensing the fluid;
an insert slidably coupled to the retainer, the insert including a tube coupling portion defining a notch;
a dispensing tube coupled between the tube coupling portion of the insert and the spout of the housing, the tube being flexible to permit movement of the dispensing tube inside the internal cavity as the handle is moved, the tube having a tab engaged in the notch of the tube coupling portion;
a pump mechanism coupled to the dispensing tube at the coupling portion of the insert for supplying the fluid to the spout via the dispensing tube, wherein the insert transmits the movement of the handle to actuate the pump mechanism;
the pump mechanism including a pump head and a pump body with a feed tube, the pump head configured to move in a telescoping fashion relative to the pump body; and
the dispensing tube including
an outlet opening secured to the fixed spout to remain at a fixed location as the handle is moved, and
a pump connector connected to the pump head, the pump connector being moveable with the pump head as the pump head moves in the telescoping fashion.

* * * * *